US007308606B2

(12) United States Patent
Challenger et al.

(10) Patent No.: US 7,308,606 B2
(45) Date of Patent: Dec. 11, 2007

(54) SYSTEM AND METHOD FOR PERSISTENT AND ROBUST STORAGE ALLOCATION

(75) Inventors: James R. H. Challenger, Garrison, NY (US); Arun K. Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/969,525

(22) Filed: Oct. 20, 2004

(65) Prior Publication Data

US 2005/0055526 A1    Mar. 10, 2005

Related U.S. Application Data

(63) Continuation of application No. 10/261,886, filed on Sep. 30, 2002, now Pat. No. 6,851,034, which is a continuation of application No. 09/504,610, filed on Feb. 15, 2000, now Pat. No. 6,643,754.

(51) Int. Cl.
*G06F 12/16* (2006.01)
*G06F 12/02* (2006.01)

(52) U.S. Cl. .............................. 714/15; 714/16; 714/5; 714/6; 711/156

(58) Field of Classification Search ............... None
See application file for complete search history.

(56) References Cited

U.S. PATENT DOCUMENTS

| | | | | |
|---|---|---|---|---|
| 4,814,971 A | * | 3/1989 | Thatte ......................... 714/15 |
| 5,488,701 A | * | 1/1996 | Brady et al. .................... 714/6 |
| 5,784,698 A | | 7/1998 | Brady et al. | |
| 5,784,699 A | | 7/1998 | McMahon et al. | |
| 5,835,959 A | * | 11/1998 | McCool et al. ............. 711/171 |
| 6,055,612 A | * | 4/2000 | Spertus et al. .............. 711/165 |
| 6,307,139 B1 | * | 10/2001 | Iwamura ....................... 84/601 |
| 6,446,183 B1 | * | 9/2002 | Challenger et al. ......... 711/170 |
| 6,449,625 B1 | * | 9/2002 | Wang .......................... 707/206 |
| 6,493,730 B1 | * | 12/2002 | Lewis et al. ................. 707/206 |
| 6,502,111 B1 | * | 12/2002 | Dussud ........................ 707/206 |
| 6,941,503 B1 | * | 9/2005 | Homberg et al. ............ 714/755 |

FOREIGN PATENT DOCUMENTS

WO    WO 93/22719    11/1993

OTHER PUBLICATIONS

"Dynamic Memory Allocation Using Fixed Size Blocks in a Shared Memory Space", IBM Technical Bulletin, vol. 38, No. 8, Aug. 1, 1995 p. 189.
A. Iyengar, "Scalability of Dynamic Storage Allocation Algorithms", IEEE, 1996, pp. 223-232.
T. Johnson, "Space Efficient Parallel Buddy Memory Management", IEEE, 1992, pp. 128-132.

* cited by examiner

*Primary Examiner*—B. James Peikari
(74) *Attorney, Agent, or Firm*—F. Chau & Associates, LLC

(57) ABSTRACT

A method for managing computer memory, in accordance with the present invention, includes maintaining multiple sets of free blocks of memory wherein a free block is added to a set based on its size. In response to a request for a block of a request size, a set of blocks is searched for a free block which is at least as large as the request size but smaller than the request size plus a threshold. If such a block is found, the block is allocated in its entirety.

12 Claims, 20 Drawing Sheets

FIG. 7A
(Prior Art)
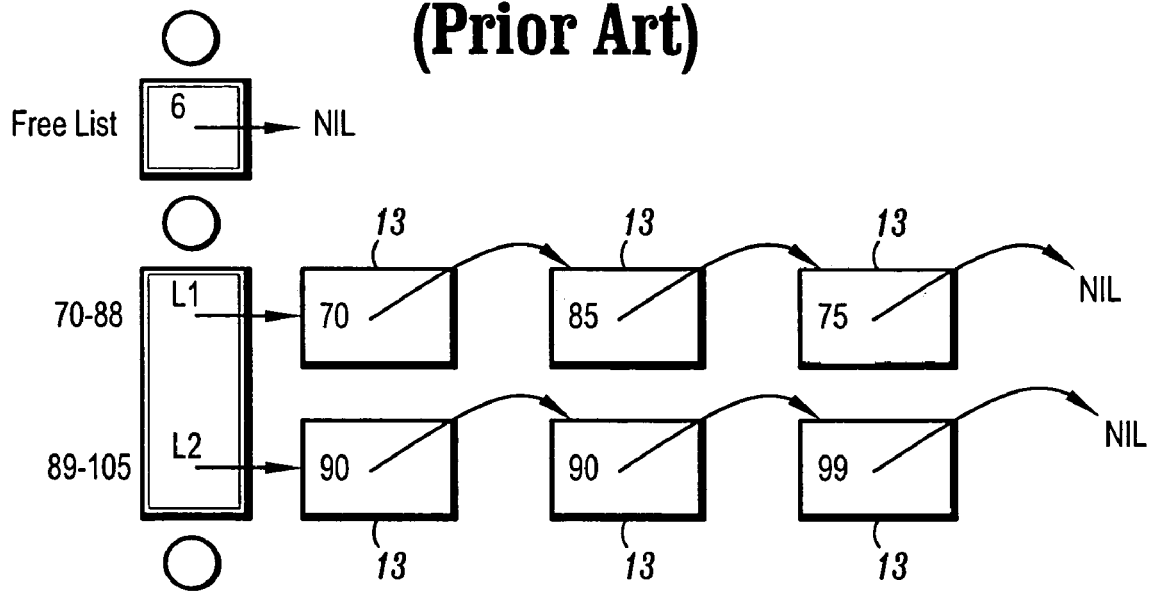
ALLOCATE 84
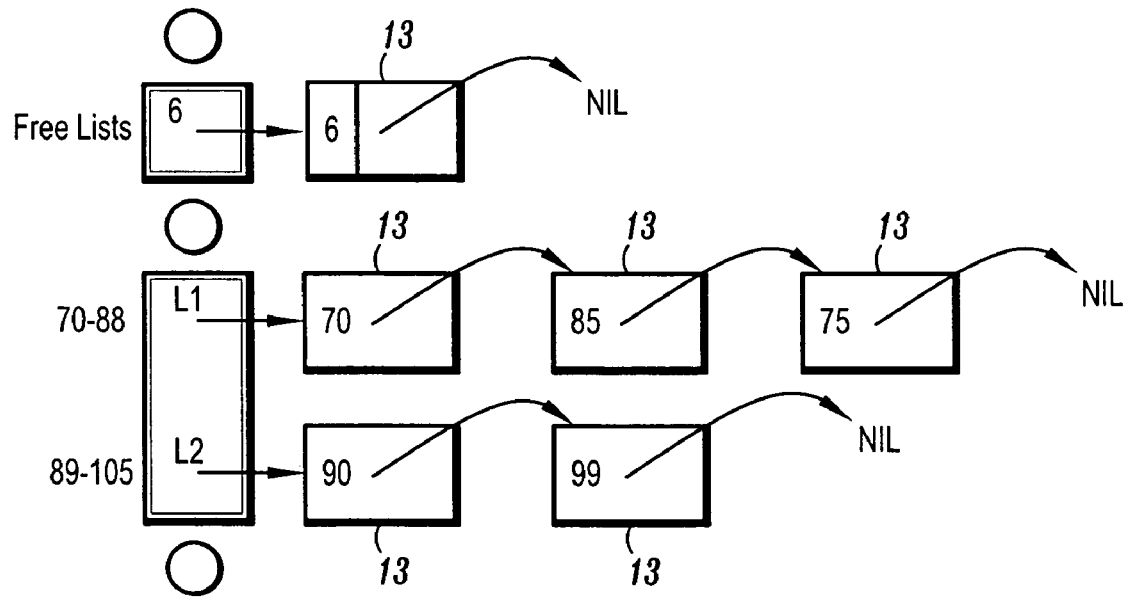
FIG. 7B
(Prior Art)

SYSTEM AND METHOD FOR PERSISTENT AND ROBUST STORAGE ALLOCATION

CROSS-REFERENCE TO RELATED APPLICATION

This application is a Continuation of U.S. application Ser. No. 10/261,886 filed on Sep. 30, 2002, now U.S. Pat. No. 6,851,034 which is Continuation of U.S. application Ser. No. 09/504,610 filed on Feb. 15, 2000, which issued on Nov. 4, 2003 as U.S. Pat. No. 6,643,754, the disclosure of which in its entirety is incorporated by reference herein.

BACKGROUND OF THE INVENTION

1. Field of the Invention

The present invention relates to computer storage methods and systems, and more particularly to methods and systems for robust dynamic storage allocation.

2. Description of the Related Art

Many computer systems need to allocate storage dynamically. Dynamic storage allocation is used by operating systems to allocate storage for executing programs. Other examples of dynamic storage allocation may include Web servers which store Web data. In many cases, sizes of memory being requested are unknown until the time of the request. The lifetime for a dynamically allocated block may also be unknown.

A considerable amount of work has been performed in developing efficient dynamic storage allocation algorithms for main memory. Considerably less work has been done in developing efficient dynamic storage allocation algorithms for disks.

Dynamic storage allocation on disk is important for a number of reasons. In many cases, it is essential to have data which persists over time, even after the system is shut down. Disk memory provides persistent storage. Disk memory also provides fault-tolerant storage; information stored on disk can often be preserved after a system crash in situations where the contents of main memory are lost. Another advantage of disk memory includes the possibility that more of disk memory can be made available at a more reasonable price than main memory. It can thus be used for storing information which cannot fit in main memory.

Referring in FIG. 1, a first fit system allocates (all or part of) the first memory block located which is large enough to satisfy a memory request. For a memory request of "7", a first fit returns B1 since this is the first block encountered which can satisfy the request. A best fit system allocates (all or part of) a smallest block which is large enough to satisfy a request. In FIG. 1, block B3 would be returned since "7" fits best in B3 (which has a capacity of 8).

Referring to FIG. 2, in a binary buddy system, block sizes are in powers of 2 (e.g., 4 and 4, 8 and 8, etc.). Many dynamic storage allocators (DSA's) maintain one or more lists of free blocks. Such lists are known as free lists, e.g., lists of free blocks. Separate free lists exist for blocks of different sizes. Buddy system allocating blocks of other sizes also exist as well. A good overview of prior art in dynamic storage allocation is described in a paper by Arun Iyengar titled "Scalability of Dynamic Storage Allocation Algorithms" published in Proceedings of IEEE Frontiers '96, October 1996, as well as the bibliographic references in this paper.

Dynamic storage allocators (DSAs) can use different methods for coalescing adjacent free blocks. One approach is to use immediate coalescing, in which a deallocated block is combined with neighboring free blocks at the time the block is deallocated as shown in FIG. 3. In FIG. 3, the block sizes are indicated in each block. A positive size indicates a free block, while a negative size indicates an allocated block.

Referring to FIG. 4, another approach includes deferred coalescing. When deferred coalescing is used, adjacent free blocks are not automatically combined after a deallocation. Instead, at some point (such as when a large enough block to satisfy a request cannot be located), the DSA will scan through blocks in memory and combine adjacent ones as shown in FIG. 4.

Fragmentation is memory wasted by a DSA. Internal fragmentation is memory lost by satisfying a request with a block larger than the request size (e.g., satisfying a request for a block of size 25 with a block of size 32). External fragmentation occurs when free blocks become interspersed with allocated blocks. In these situations, an allocation request for b bytes may be unsatisfiable even if >b bytes are free because the largest contiguous block of free storage is smaller than b bytes.

Multiple free list fit I (MFLF I) as described in "Scalability of Dynamic Storage Allocation Algorithms" cited above uses multiple free lists, organized by size. Free lists for small blocks are known as quick lists. Free lists for large blocks-are known as misc lists. When a single misc list is maintained, MFLF I degenerates into a storage allocation system known as quick fit.

Referring to FIG. 5, a quick fit technique is shown. In this system, quick lists exist for blocks up to size 16; the number of quick lists can be varied to optimize performance for different request distributions. In this example, allocations for a block of size s where $2 \leq s \leq 16$ (2 is the minimum block size) is done by examining the quick list for size s. If this list is not empty, the first block on the list is used to satisfy the request. Note that it is possible to have quick lists for block sizes corresponding to multiples of grain sizes. For example, in FIG. 2, the grain size is 1. If the grain size is 1000, quick lists for blocks of size 1000, 2000, 3000, . . . , 16000, (a total of 16 quick lists) may be used. MFLF I uses deferred coalescing. Memory is divided into working storage 12 and a tail 14 as shown in FIG. 5. Working storage 12 includes allocated blocks and blocks on a free list. Tail 14 includes a contiguous block of unallocated storage at one end of the memory. Initially, before anything is allocated, tail 14 includes all allocatable memory, and free lists are empty free lists include quick lists and misc lists, where misc lists are employed for larger memory blocks. Blocks 13 include a size (indicated by the numbers in blocks 13). When a request cannot be satisfied by examining one or more free lists, the request is satisfied by allocating from tail 14. A tail pointer (tail ptr.) indicates where tail 14 begins. Free lists are populated when allocated blocks are deallocated.

To satisfy a request for a block which is too large for a quick list, quick fit does a first fit search of the misc list. Searches for large blocks may require many instructions. To reduce this overhead, MFLF I can use multiple misc lists, as indicated in FIG. 6, instead of a single list as in quick fit. In FIG. 6, a misc list exists for blocks 13 of size 17-25, another one exists for blocks 13 of size 26-40, and yet another one exists for blocks of size 41-60. Various strategies can be used for satisfying a request, including the one shown in FIGS. 7A and 7B to allocate "84" using MFLF I. FIG. 7A shows a "before" snapshot of memory while FIG. 7B shows an "after" snapshot when the request to allocate 84 is satisfied. In FIGS. 7A and 7B, the system allocates a first block on list L2 to satisfy the request by splitting a block of size "90" and returning the excess of size "6" to a free list. The system examines L2 instead of L1 because a smallest block allowed on L2 is of size 89. Therefore, it is not necessary to search beyond the first block in L2 to satisfy a request of size less than or equal to 89.

Although the techniques described above are sufficient for many applications, straightforward adaptations of main-memory dynamic storage allocation algorithms to disk systems often result in poor performance because the latency for accessing and writing to disks is much higher than for main memory.

Therefore, a need exists for dynamic storage methods for disk memory which reduces a number of accesses and a number of writes to a disk. A further need exists for memory allocation and deallocation methods which provide for more efficient storage and faster access times.

SUMMARY OF THE INVENTION

A method for managing computer memory, in accordance with the present invention, includes maintaining multiple sets of free blocks of memory wherein a free block is added to a set based on its size. In response to a request for a block of a request size, a set of blocks is searched for a free block which is at least as large as the request size but smaller than the request size plus a threshold. If such a block is found, the block is allocated in its entirety. In other methods, the step of maintaining multiple sets of free blocks may include the steps of maintaining the multiple sets of free blocks on a disk or in main memory. The steps of, if the free block is not found but at least one block at least as large as the request size is found, splitting the at least one block at least as large as the request size and satisfying the request with a second block resulting from the splitting step may be included. The at least one block being split may be a smallest found block larger than the request size. The multiple sets may include a set of largest blocks and the first threshold may be larger than a smallest permitted block size for the largest set of blocks, and the step of searching the largest set of blocks to satisfy the request may be included. The step of searching may include the step of searching the set which includes a list, the list including memory block allocation information for the set. The method may further include the step of dynamically adjusting at least one of the first and the second thresholds to tune performance.

In still other methods, the method may include the steps of maintaining a contiguous block of memory, selecting the set of free blocks based on the request size, in response to the set of free blocks being non-empty, allocating at least part of a first block located in the set and in response to the set being empty, satisfying the request from the contiguous block of memory. The method may include the steps of maintaining a pointer to the contiguous block for a first pointer location, in response to a request for storage of a given size, incrementing the pointer by the given size to point to a second pointer location and satisfying the request using a part of the contiguous block beginning at the first pointer location. The method may also include deallocating an allocated block to a new set of free blocks based on the size of the allocated block.

A method for managing a block of contiguous persistent memory includes the steps of maintaining a first pointer in main memory for determining a first free byte in a first block of memory, maintaining headers in the persistent storage for a plurality of blocks wherein the headers include at least one code byte and allocating a second block from the first block by setting the at least one code byte for the second block to indicate that the second block is no longer part of the first block and updating the first pointer in the main memory.

In other methods, the step of adding a block, b, to the first block may be included, the step adding including the steps of modifying a code byte corresponding to b to indicate that b is part of the first block, and updating the first pointer in the main memory. The at least one code byte may serve other functions in addition to indicating that the second block is no longer part of the first block. The method may include the step of periodically updating a second pointer in the persistent memory based on the value of the first pointer in the main memory. The method may further include the step of, in response to a system failure, updating the first and second pointers by examining the at least one code byte. The headers may be initialized using a single block write.

A method for coalescing adjacent free blocks in persistent storage includes the steps of maintaining a header for each block indicating a size and an allocation status of the block, coalescing the free blocks by examining header information to combine adjacent free blocks and periodically storing information in the persistent storage indicating a level of coalescing achieved.

The method for coalescing may include the steps of, in response to a system failure during coalescing, reading information in the persistent storage to determine the level of coalescing achieved before the system failure and resuming coalescing at a point based on the information in the persistent storage.

The methods and method steps may be implemented with a program storage device readable by machine, tangibly embodying a program of instructions executable by the machine to perform the method steps.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIGS. 7A and 7B depict before and after snapshots for an example of allocation for large blocks using MFLF I in accordance with the prior art;

DETAILED DESCRIPTION OF PREFERRED EMBODIMENTS

Figure 1:
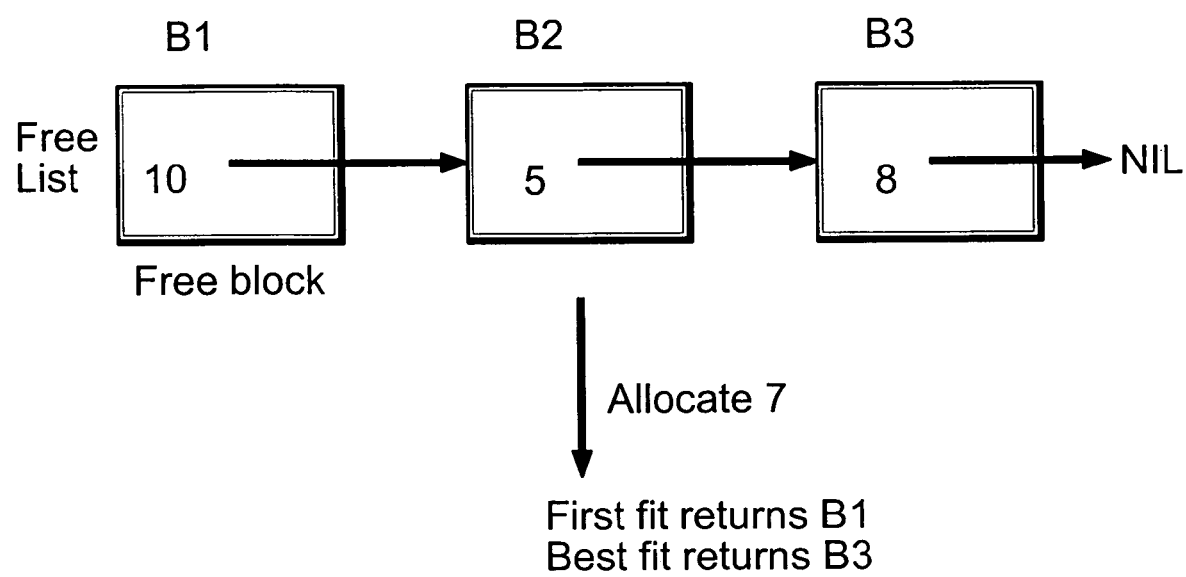
FIG. 1 is a schematic diagram illustratively showing a first fit allocation and a best fit allocation.
Figure 2:
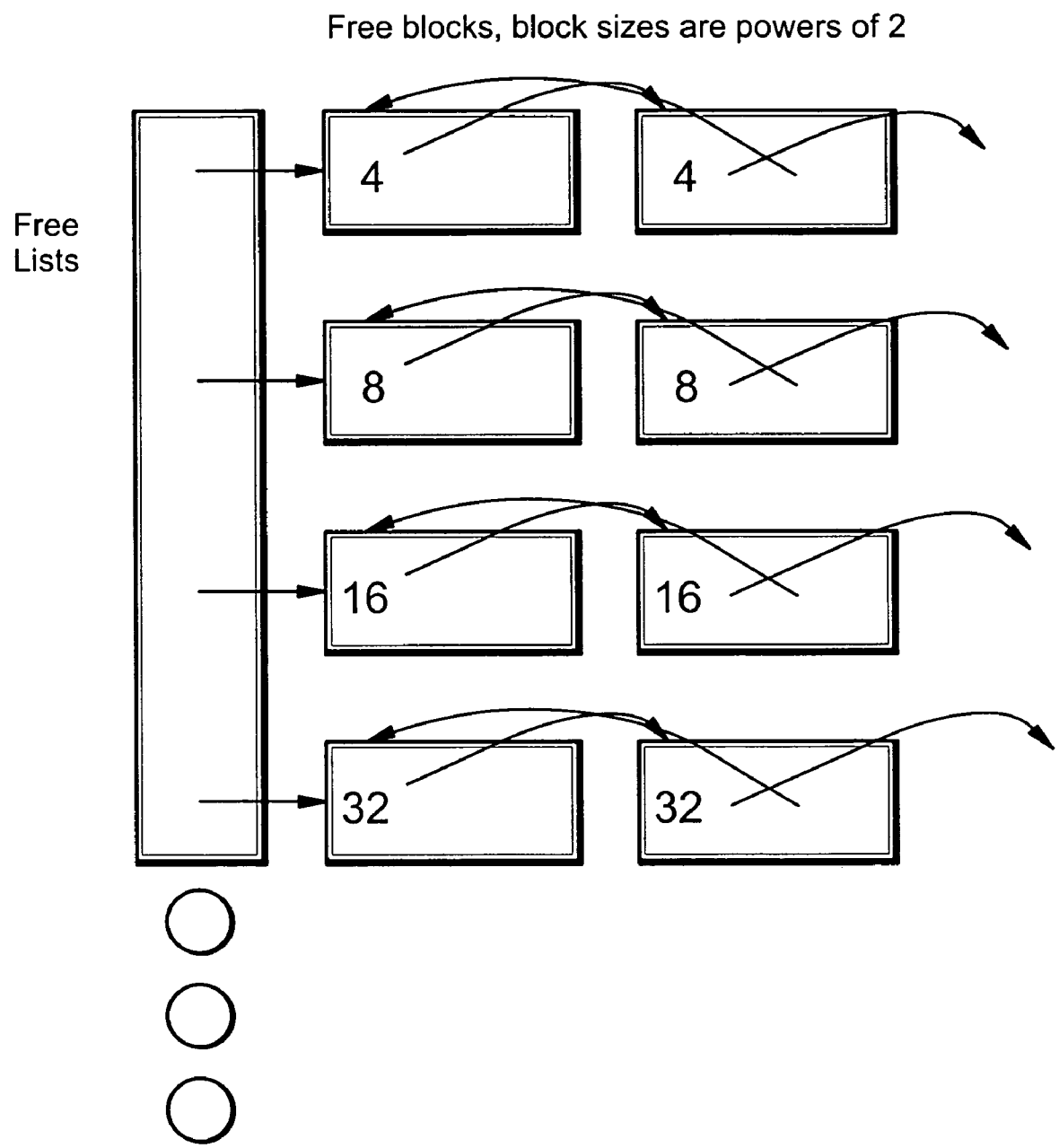
FIG. 2 is a schematic diagram illustratively showing a binary buddy system in accordance with the prior art.
Figure 3:
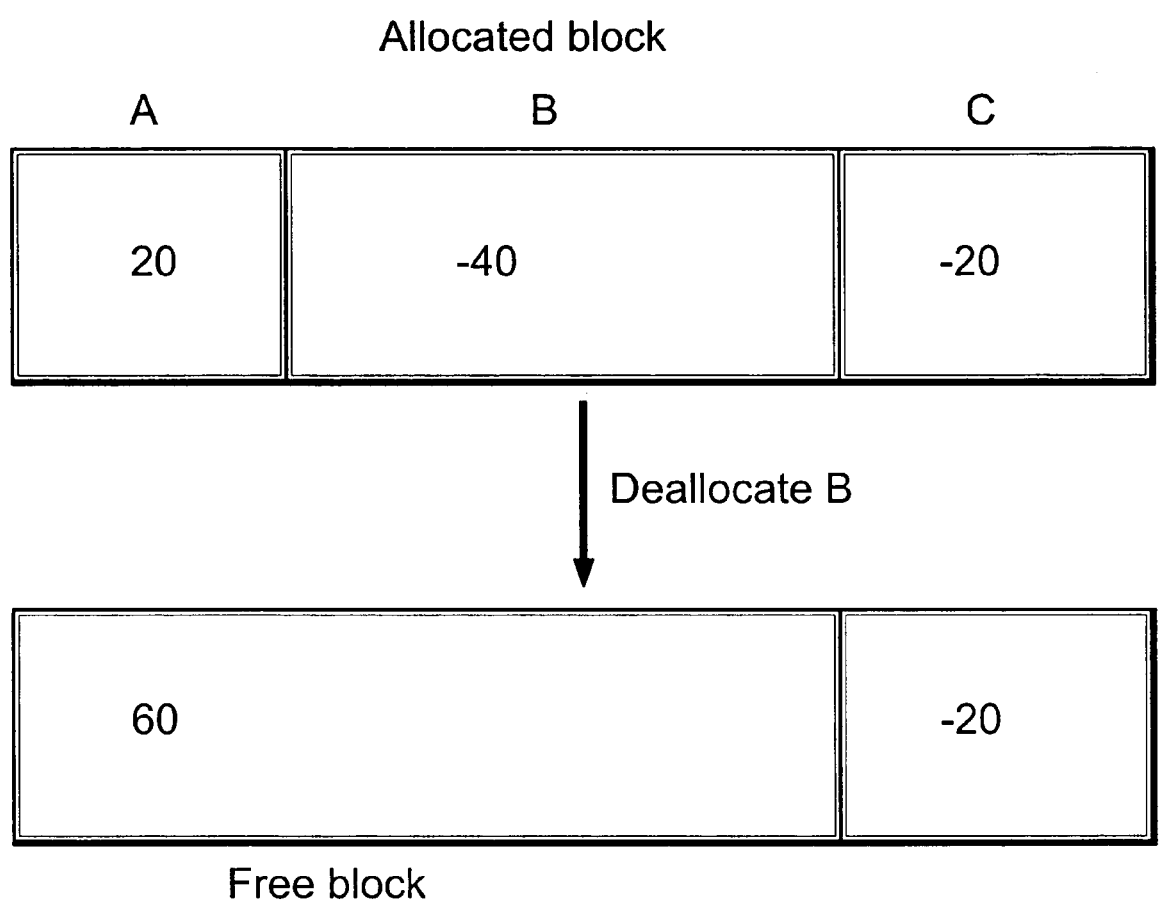
FIG. 3 is a schematic diagram illustratively showing an immediate coalescing of memory blocks.
Figure 4:
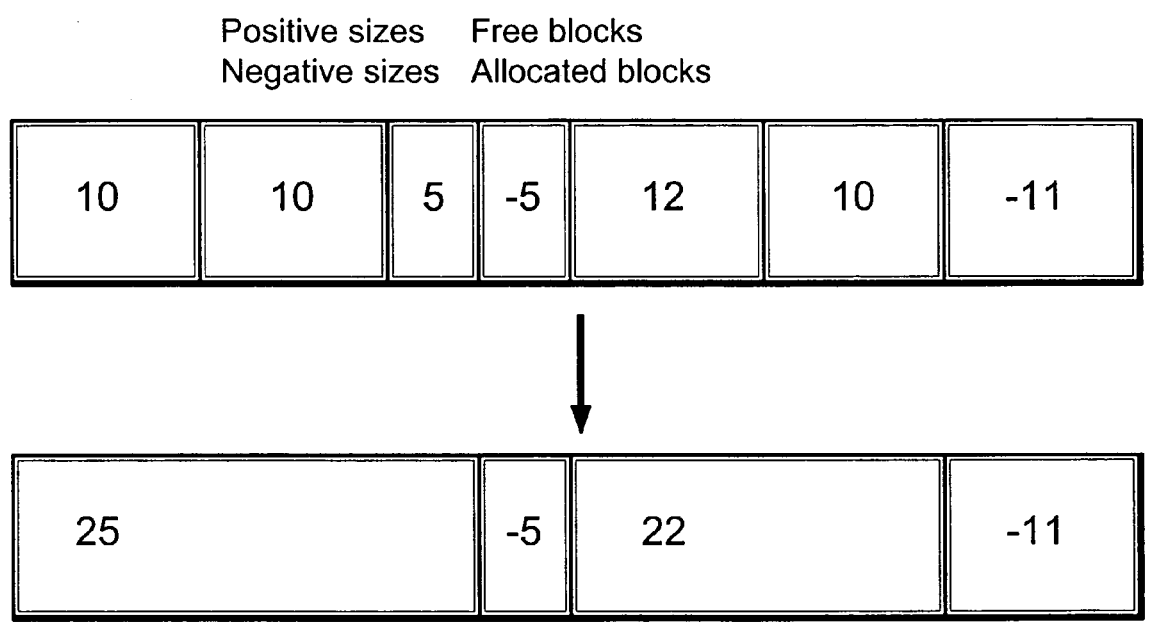
FIG. 4 is a schematic diagram illustratively showing a deferred coalescing of memory blocks.

The present invention relates to memory management and allocation systems and methods. The systems and methods presented herein provide improved performance over prior art systems and methods, and the present invention is particularly useful for disk memories. Techniques in the prior art for storing information persistently on disks include using file systems and databases.

By the present invention, information may be stored on disk using much less overhead than if prior art techniques were employed. Also, by employing the present invention, large numbers of objects can be stored. Many file systems are limited by the number of files that can be stored in a directory; the present invention does not have these limitations for the number of objects being stored.

In one embodiment, a method is provided designed to minimize splitting of blocks without significantly wasting extra storage space. The utility of the present invention extends to both disk allocation and main memory allocation.

The present invention provides a new and useful dynamic storage allocation method which has similarities to MFLF I, but includes modifications which produce dramatic improvements in memory management and disk performance. One modification includes a reduction in the number of block splits. Reducing the number of block splits becomes more important when splitting blocks is undesirable, such as, for disk allocation.

It should be understood that the elements shown in FIGS. 8-19 may be implemented in various forms of hardware, software or combinations thereof. Preferably, these elements are implemented for storage devices on one or more appropriately programmed general purpose digital computers having a processor and memory and input/output interfaces.

It is to be understood that, upon disclosure of the present invention, one skilled in the art could adapt a number of commonly used storage allocation algorithms to employ the present invention as will be described herein below. The present invention will therefore be illustratively described by the following embodiments which should not be construed as limiting the present invention. In memory or main memory as employed in the present invention may refer volatile memory, such as random access memory or cache memory, although other memory types may be employed. Disk or disk memory refer to persistent memory, which may include, hard disks, floppy disks, compact disk, DVD, disk arrays or other persistent storage devices.

MFLF I, as described above, will sometimes split free blocks during allocations to allocate part of a block and return the other part to free storage. The present invention advantageously reduces the number of blocks which are split as compared with MFLF I. This is one important parameter for allocating disk storage, because splitting blocks can cause extra disk operations (where an operation is a read or a write). The present invention, therefore, makes fewer splits when allocating blocks than MFLF I. The present invention can be used for allocating main memory as well as disk memory.

Figure 8:
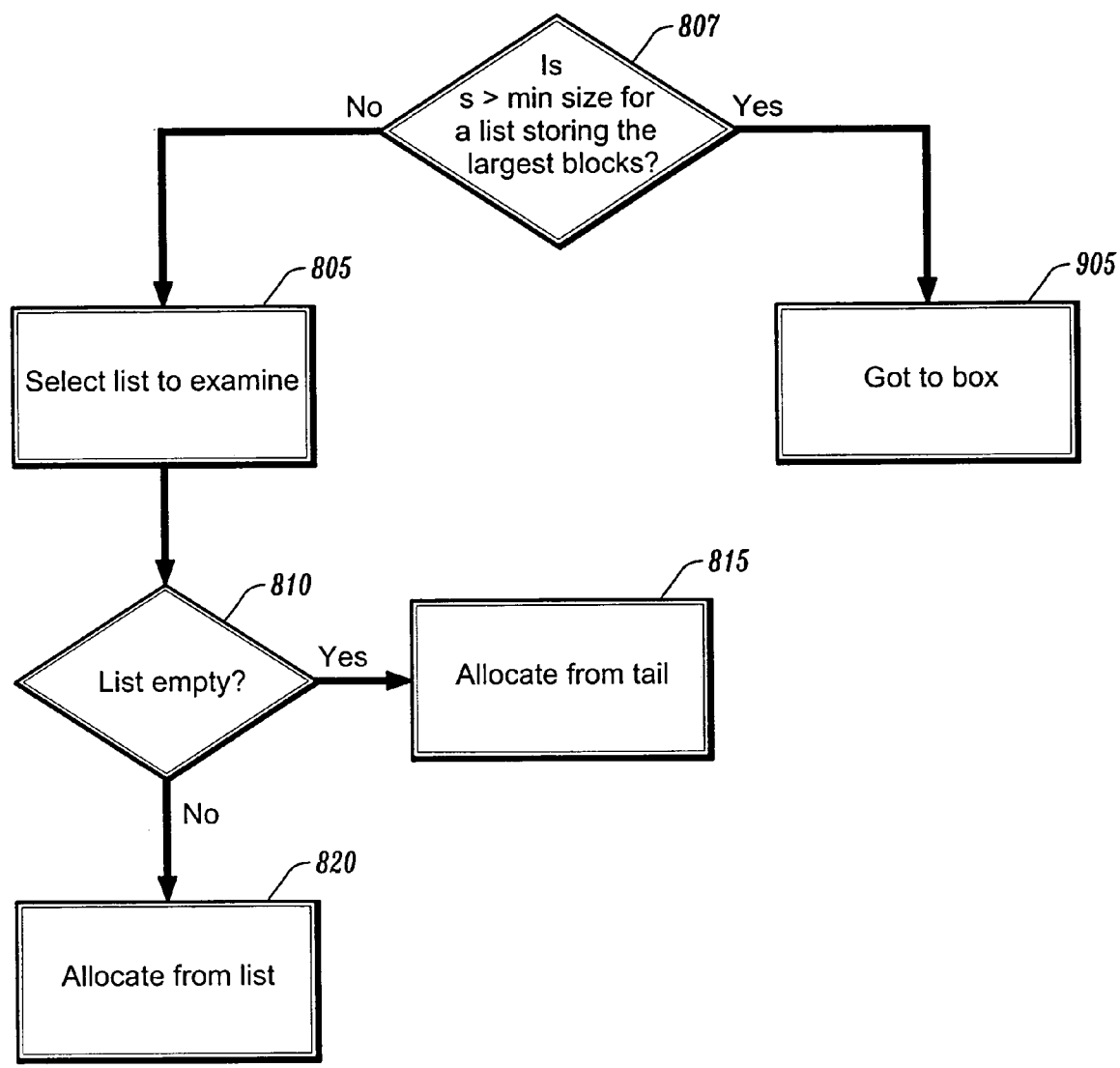
FIG. 8 is a block/flow diagram showing a multiple free list fit allocation (MFLF III) in accordance with the present invention.
Figure 9:
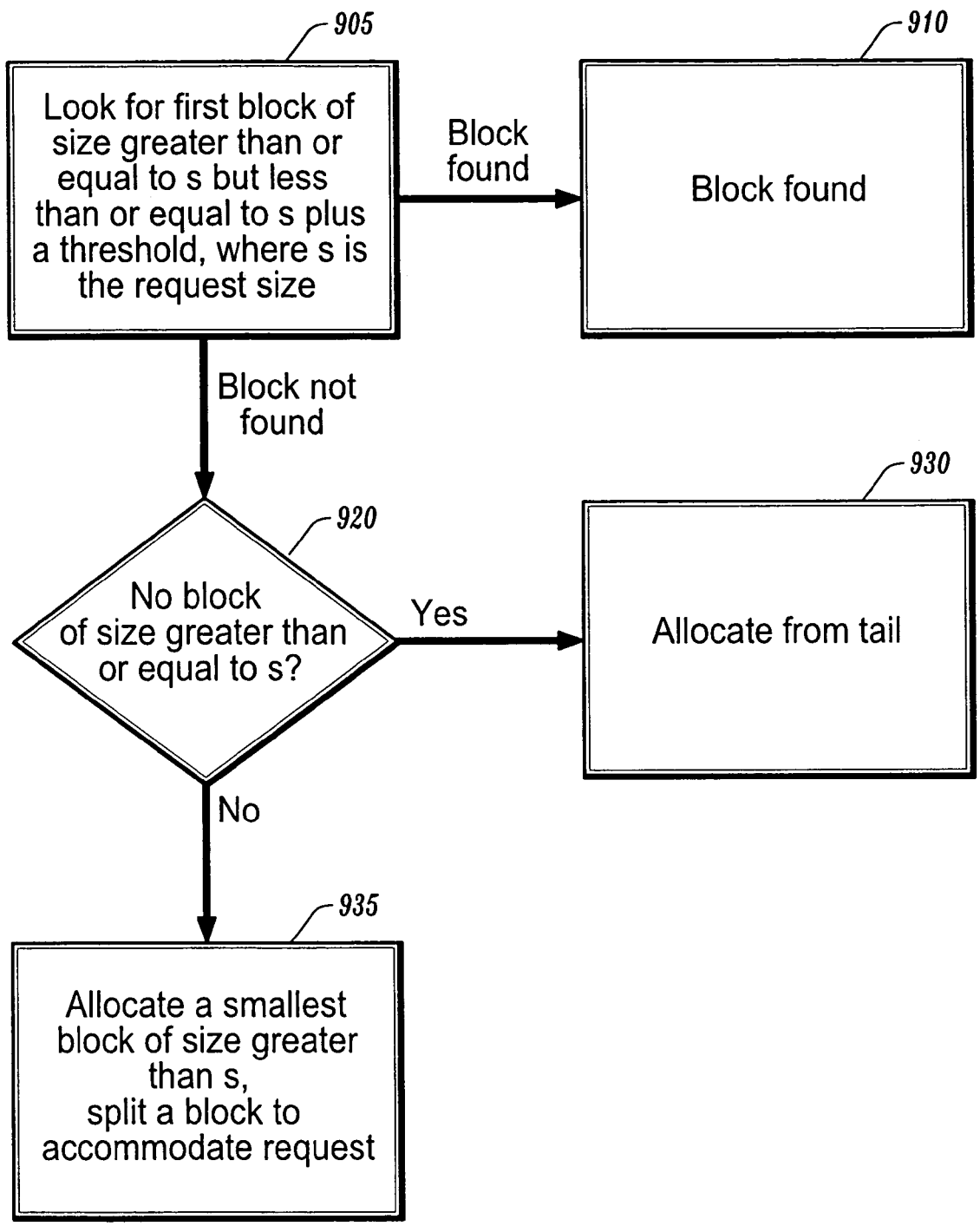
FIG. 9 is a block/flow diagram showing a multiple free list fit (MFLF. III) allocation for large blocks in accordance with the present invention.

Referring now to the drawings in which like numerals represent the same or similar elements and initially to FIGS. 8 and 9, block diagrams showing systems/methods for allocation and storage management for disks are depicted. Lists (e.g., quick lists, misc lists or free lists) usually have minimum (min) and maximum (max) sizes representing the largest and smallest blocks which can be stored on the list (for a quick list where the grain size is 1, the min and max sizes would be identical). In systems with maximum block sizes, the max size for the last misc list may be the maximum block size. In systems without maximum block sizes, the last misc list may not have a max size.

Let s be the request size. In box 807, it is determined if s>the min size for the list storing the largest blocks. If so, processing continues to box 905 of FIG. 9. If not, processing continues to box 805. In box 805, the system selects an appropriate list to examine. The list L with the smallest min size, l min, such that l min≧s is selected. Other criteria may also be employed for list selection. Processing continues to box 810. In box 810, it is determined if list L is empty. If so, a block of size l min is allocated from a tail and used to satisfy the request in box 815. If list L is not empty, the first block from list L is used to satisfy the request without splitting any memory blocks in box 820. When list L includes blocks of different sizes, a straightforward extension to one skilled in the art would be to do some searching of list L to get a better fitting block and/or to split the block selected for allocation to reduce internal fragmentation.

Referring to FIG. 9, an allocation strategy for large blocks is shown in accordance with the invention. Let L be the misc list storing the largest blocks. In box 905, L is examined to locate a first block of size≧s but≦s+a threshold (e.g., acceptable_waste) acceptable_waste is a parameter which is used to split blocks in some cases during allocations to reduce internal fragmentation. If an appropriate block is found, the block is allocated in box 910 without splitting. If such a block is not found, there are two possibilities. If no block on-L is large enough to satisfy the request, a block of size s is allocated from the tail in block 930. If L includes a block which is large enough, a smallest block on L of size>s is split into fragments f1 and f2 of size s and r respectively (box 935).

f1 is used to satisfy the request. f2 is placed at the beginning of a free list corresponding to its size. The acceptable_waste parameter can vary dynamically. A straightforward variation would be to use a function in place of the acceptable_waste parameter, which could take arguments such as the request size, for example.

Deallocation in accordance with the present invention is straightforward. Deallocated blocks are placed at the beginning of free lists corresponding to their sizes. In one embodiment, deferred coalescing is employed. When the present invention is used for main memory allocation, coalescing is straightforward.

The present invention includes new and novel methods for performing deferred coalescing for a dynamic storage allocator (DSA) managing disk storage, which can be used in conjunction with a variety of different methods, including but not limited to first fit, best fit, buddy systems, MFLF systems, etc.

Storage blocks include headers. Headers include block sizes as well as a tag indicating whether the block is free or allocated. Header information is included on disk so that it is preserved when the system crashes or is turned off. Header information may also be cached in main memory for faster access. Header information may be maintained on disk in a variety of ways. One method is to use designated bytes of a block (e.g. the initial bytes) for header information. Another method would be to store header information for multiple blocks in a single block of contiguous memory.

Figure 10:
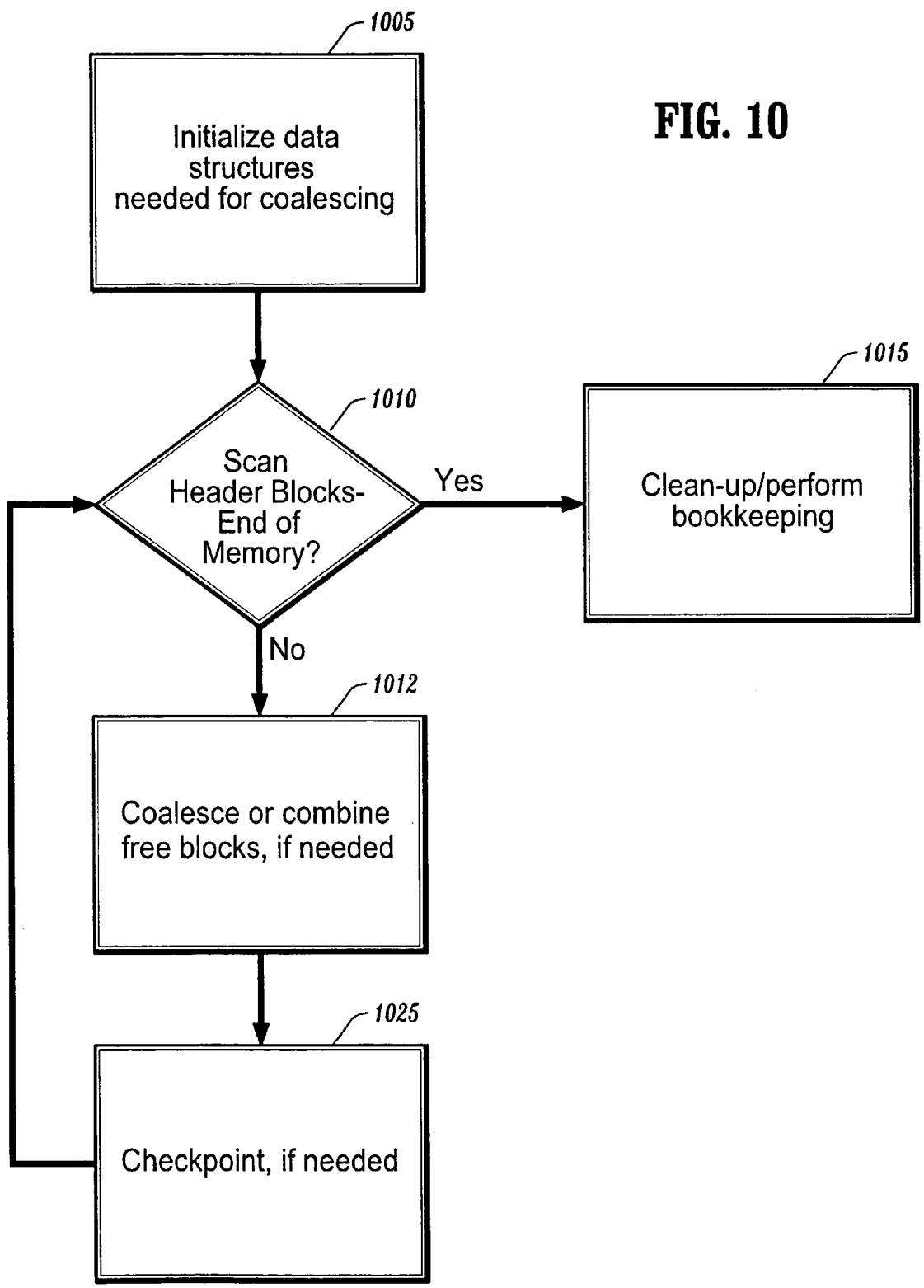
FIG. 10 is a block/flow diagram showing coalescing adjacent free blocks in accordance with the present invention.

Referring to FIG. 10, one preferred method for coalescing adjacent free blocks is shown. In box 1005, data structures needed for coalescing are initialized. For example, many DSA's utilize free lists. Such DSA's would use box 1005 to initialize free lists (e.g. make one or more free lists empty). Boxes 1010, 1020, and 1025 form a loop in which the system scans header blocks and combines adjacent free blocks. The system begins with blocks at one end of memory, reading the header corresponding to the first block. The system then scans through headers sequentially, and combines adjacent free blocks. For memory systems utilizing free lists, free blocks are added to appropriate free lists after they have been coalesced. In box 1025, the system checkpoints the coalesce by recording the point at which the coalesce has advanced to in persistent storage. One purpose of the checkpoint is to reduce the amount of work that is needed in the event of a failure. Checkpointing is employed by the present invention to update obsolete information.

In the event of a system failure, the contents of main memory are likely to be lost, while the contents of disk memory are likely to be preserved. In the event of a system failure, the checkpoint can eliminate the need to redo most or all of the coalescing work already performed. By contrast, methods in the prior art would require a re-scan of headers from the beginning after a failure.

Advantageously, by providing sequential scanning of headers and checkpointing, a more robust and persistent memory system is provided. Further, time wasted re-coalescing after failures is reduced or eliminated, for example, 50% or more of coalescing time is eliminated, in many cases 100% of coalescing time is eliminated. The frequency with which checkpointing is performed can be varied as appropriate, for example, according to a number of transactions or after a set time has elapsed. Frequent checkpointing reduces the amount of work that needs to be redone after a failure.

In box 1015, final clean up and bookkeeping operations are performed. For example, if the end of working storage includes a free block, that block may be added to the tail in this step.

Methods for efficiently allocating and deallocating persistent storage in accordance with the present invention will now be described in greater detail. The invention may be used in conjunction with a variety of DSAs including but not limited to MFLF systems, first fit, best fit, etc. In a first illustrative memory management method (hereinafter referred to as method I, for simplicity), disks maintain headers which include block sizes as well as a tag indicating whether the block is free or allocated. Free list data structures for handling allocations and deallocations are maintained in memory.

Figure 11:
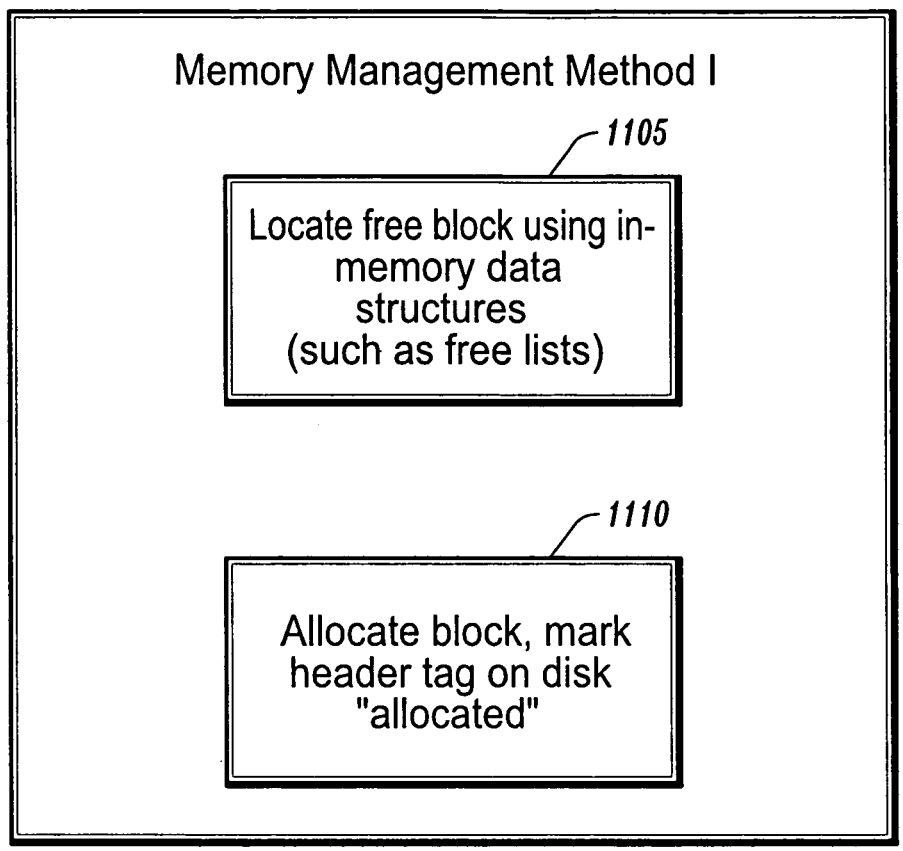
FIG. 11 is a block/flow diagram showing allocation using memory management method 1 in accordance with the present invention.

Referring to FIG. 11, allocation in accordance with memory management method I of the present invention is shown. It is to be noted the boxes shown in FIG. 11 may be performed or executed in any order. In box 1105, an appropriate free block is located using in-memory data structures. Once the block is located, it is allocated in box 1110 by modifying appropriate in-memory data structures and marking a header tag on disk "allocated". If splitting is not performed, allocation only consumes a single disk operation.

Figure 12:
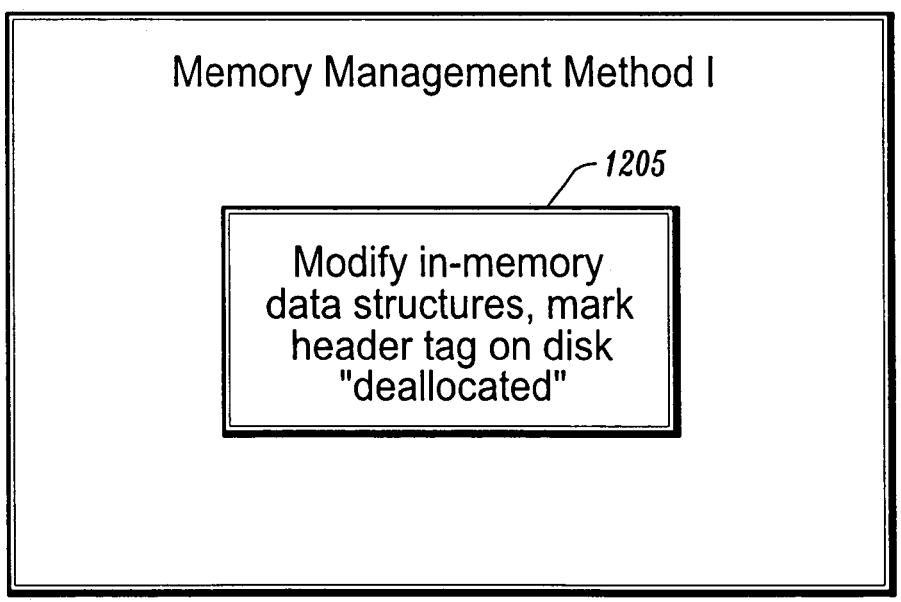
FIG. 12 is a block/flow diagram showing deallocation using memory management method 1 in accordance with the present invention.

Referring to FIG. 12, deallocation in accordance with method I of the present invention is shown. Appropriate in-memory data structures are modified to deallocate the block. In addition, the header tag on disk is marked "deallocated" in box 1205. If no coalescing is performed, deallocation only consumes a single disk operation. When the system is restarted after a failure or a normal shutdown, in-memory data structures (such as free lists) used by the DSA can be constructed by scanning the headers stored on disk. Such data can be read in incrementally as needed and does not have to be read in all at once, although it may be read in all at once.

In one embodiment, the time for reading information from disk may be reduced by maintaining multiple header words in one or more contiguous blocks of disk storage. When a contiguous block b1 becomes full, a new block b2 can be chained to b1 to include additional headers. Contiguous blocks of storage on disk can be read more quickly than information which is highly discontiguous. For example, one (or a small number) block read can be used to read several contiguous headers. Even if a block read is not used, multiple reads from disk locations in close proximity to each other may need only small movement of disk heads. This saves time.

Another embodiment, which improves start-up times after a normal shutdown, is for the DSA to output main memory data structures (such as free lists) to one or more contiguous blocks of disk storage just before shutdown. Upon restart, the DSA reads in data structures from the storage blocks written just before shutdown. This might be considerably faster than obtaining information from headers. These embodiments, as described above, may be employed for the memory management methods described below as well as for memory management method I.

Figure 13:
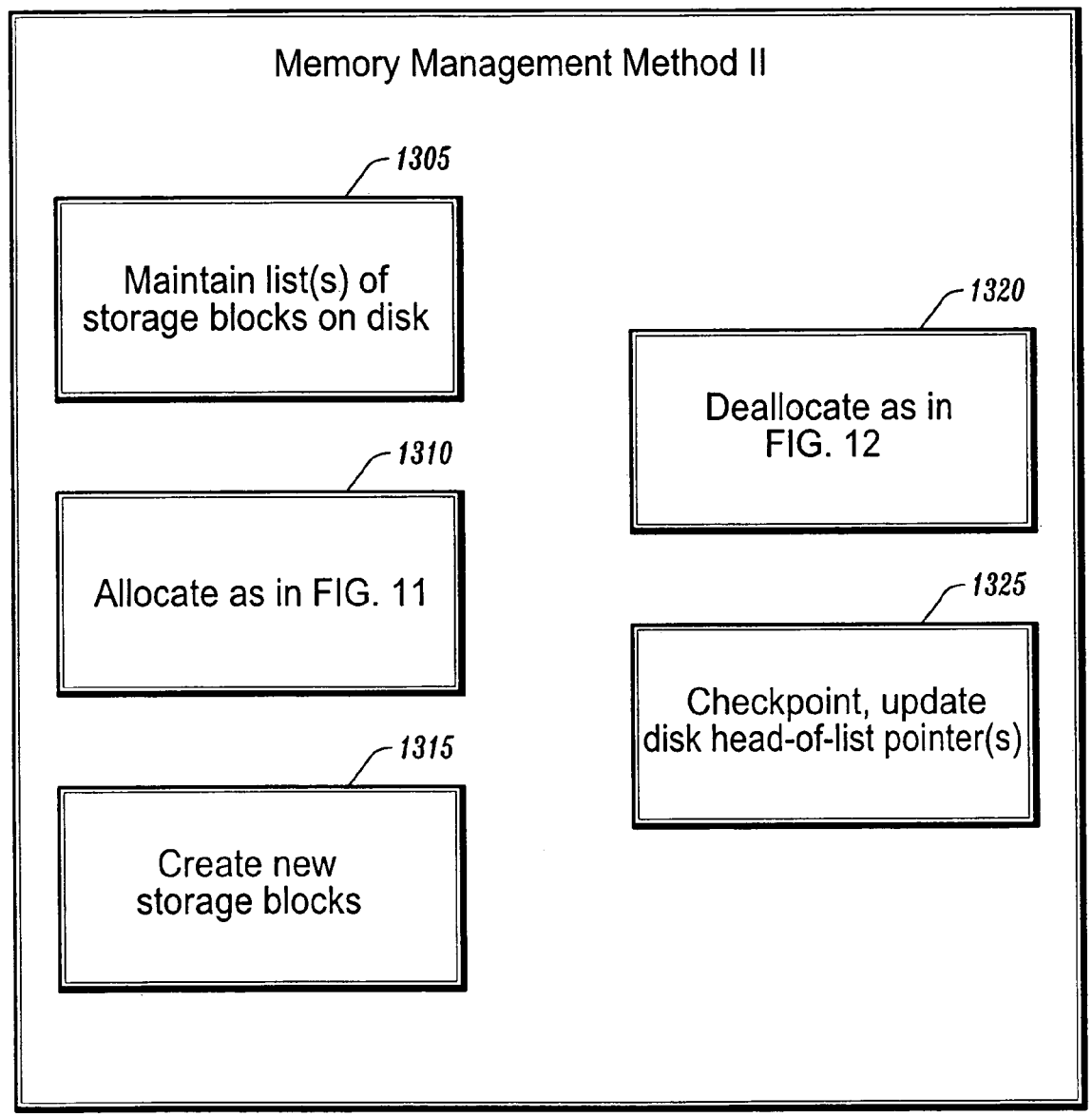
FIG. 13 is a block/flow diagram illustrating memory management method II in accordance with the present invention.

Referring to FIG. 13, another illustrative memory management method is depicted in accordance with the present invention for managing persistent storage on disk. This method will be referred to hereinafter as method II or memory management method II, for simplicity. It is to be noted the boxes shown in FIG. 13 may be performed or executed in any order. The system maintains at least one list of blocks (which may include either of or both of free and allocated blocks) on disk (box 1305). The list may be maintained by keeping list pointers in headers. Allocation (box 1310) takes place in the manner as shown in FIG. 11 and described in the accompanying text. The in-memory data structures maintained by method II may be different from those used by method I, however (see e.g., FIG. 14). Deallocation (box 1320) takes place in the manner as shown in FIG. 12 and described in the accompanying text.

It may be necessary to create new storage blocks (box 1315). This may occur when a block is allocated from the tail in MFLF algorithms. It may also occur after a block is split. When a new storage block b is created, its disk header is initialized in box 1315, which includes the allocation status of the block, block size, and pointer to the next block on the list. To minimize disk operations, these header fields can be maintained in contiguous bytes of disk storage. In this way, the headers can be updated efficiently, such as by a single block write or by multiple writes but with little movement of disk heads. b is added to the head of the free list. A head_of_list pointer may also be maintained in main memory; if so, it is updated to b. To minimize disk operations, the disk pointer to the head of the list may not be updated in box 1315. This means that the disk pointer to the head of the list may become obsolete. To update these disk pointers, the system periodically checkpoints in box 1325. For example, the system may checkpoint after every n transaction, where n is a system parameter. Transactions may include allocations, deallocations or other storage operations.

Alternatively, the system may checkpoint after every m new blocks are created, where m is a system parameter. Checkpoints are generally performed before the system is turned off during normal operation.

During the step in box 1325, disk head-of-list pointers are updated from head_of_list pointers maintained in main memory. In systems with multiple disk lists, it is desirable to maintain disk head-of-list pointers in contiguous memory locations on disk so that the head-of-list pointers can be efficiently updated, such as, by performing a single block write or multiple writes with little movement of disk heads.

Figure 14:
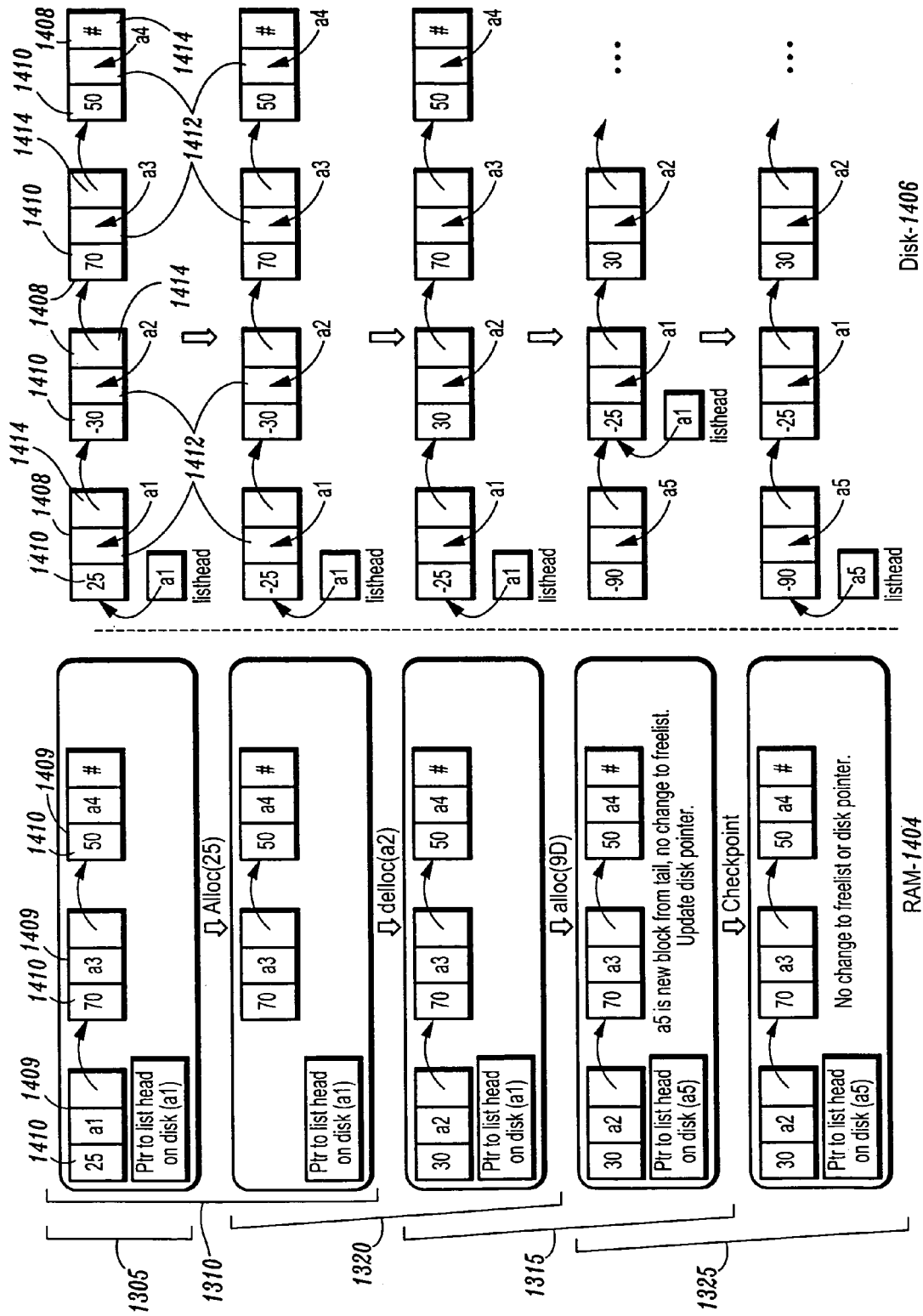
FIG. 14 is an illustrative example of memory management method II in accordance with the present invention.

Referring to FIG. 14, an illustrative example is shown depicting memory allocation using memory management method II between a random access memory (RAM) and a disk. Memory management method II may be used in conjunction with MFLF algorithms. If so, in-memory data structures are maintained for quick lists and misc lists. There does not have to be a one-to-one correspondence between in-memory lists and disk lists, although there may be.

When the system is restarted after a failure or a normal shutdown, in-memory data structures (such as free lists) used by the DSA can be constructed by scanning the headers stored on disk, either by examining block sizes and allocation status as in memory management method I, or by examining the lists stored on disk. Such data can be read in incrementally as needed and does not have to be read in all at once, although it may be read in all at once.

As shown in FIG. 14, memory management is depicted for a plurality of different storage operations for employing the present invention. The processes are divided between a random access memory 1404 and a disk 1406. Memory blocks 1408 are depicted as rectangles. Memory blocks 1408 include numbers representing a size in a first position 1410 of the block, which are positive if free and negative if allocated. The memory blocks 1409 of main memory (RAM 1404) are listed with an address, e.g., a1, a2, a3 . . . a5 where a corresponding block is located on disk 1406. A listhead points to the location of a first memory block on a list on disk 1406. The addresses of blocks 1408 on disk are indicated by address labels in a second position 1412 of blocks 1408. Address labels 1412 are depicted for ease of exposition, and such address labels are not necessarily stored on disk. A last position 1414 of blocks 1408 points to a next block of memory on the list or a "#" which means NIL or end of the list or set.

Storage operations in the example of FIG. 14 are described with reference to FIG. 13. RAM 1404 includes only blocks which are free. Maintenance of a list of blocks on disk (Box 1305) is performed. Allocation (25) is performed in accordance with box 1310. Deallocate (a2) is performed in accordance with box 1320. Allocation (90) is performed in accordance with box 1315. Note that listhead a1 becomes obsolete due to the allocation from a tail which moves to the front of the list on disk. Checkpointing in accordance with box 1325 updates the listhead to a5 as shown in FIG. 14.

Figures 15, 16:
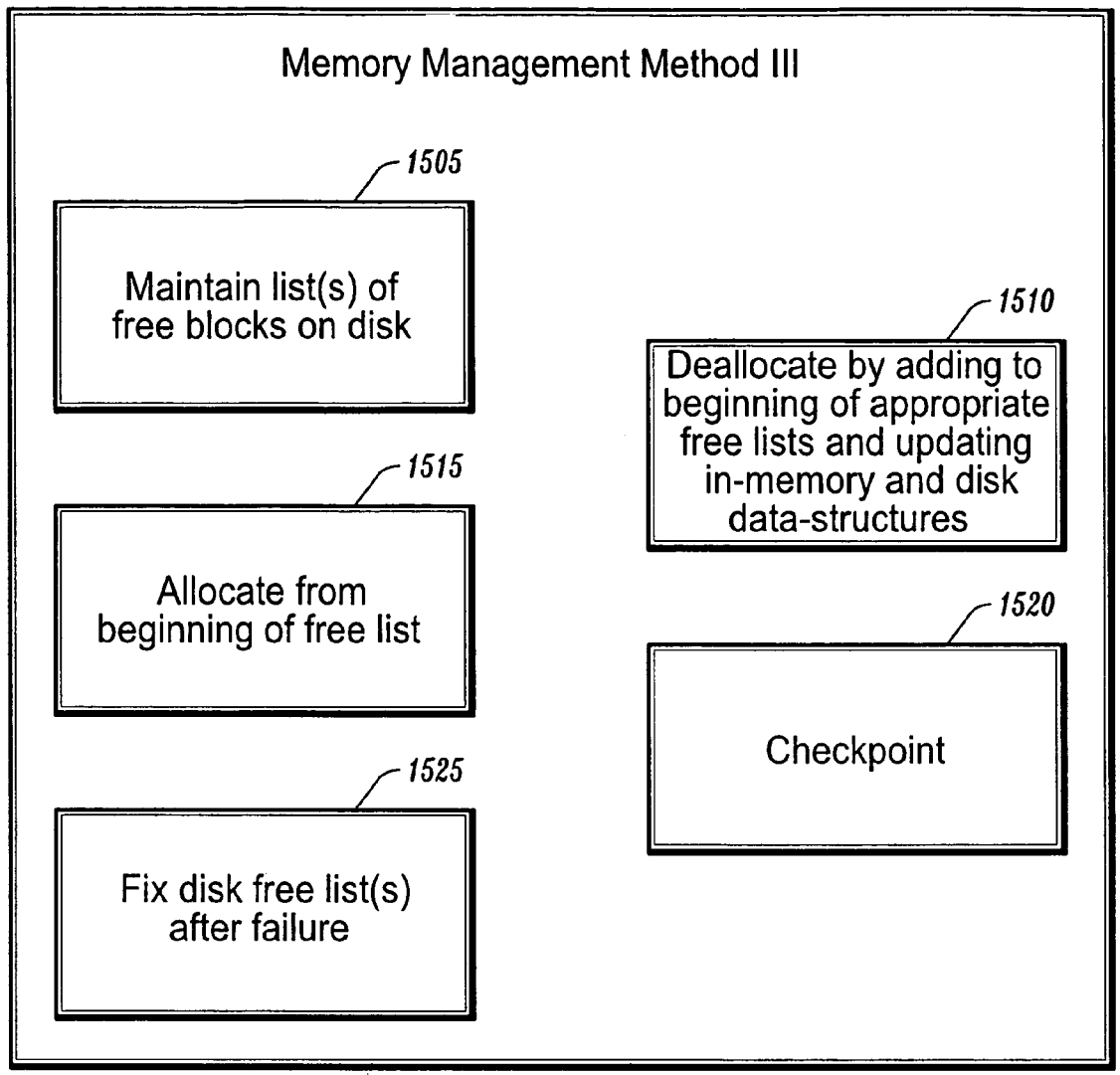
FIG. 15 is a block/flow diagram illustrating memory management method III in accordance with the present invention.
FIG. 16 is an illustrative example of memory management method III in accordance with the present invention.
Figure 16A:
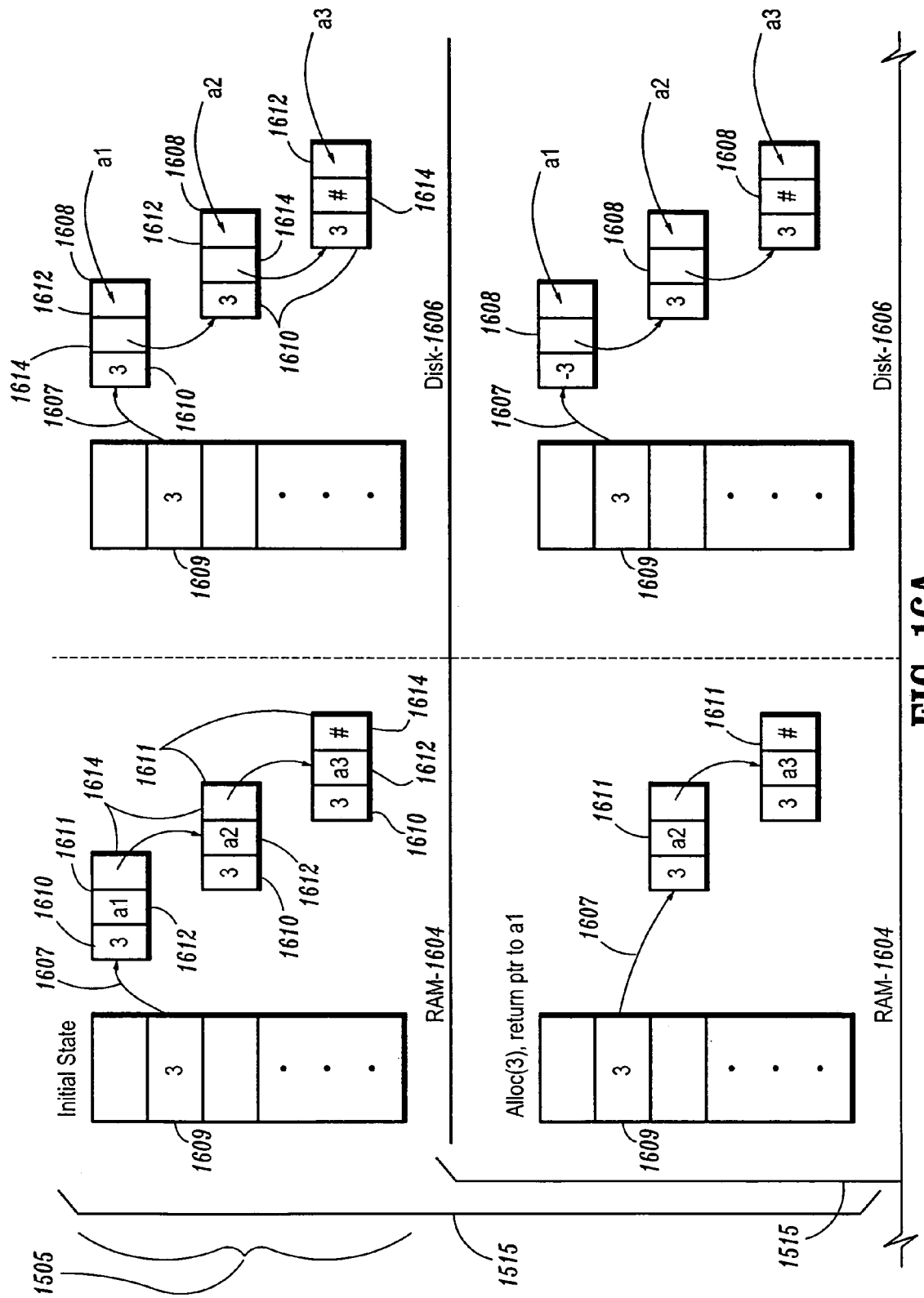
Figure 16B:
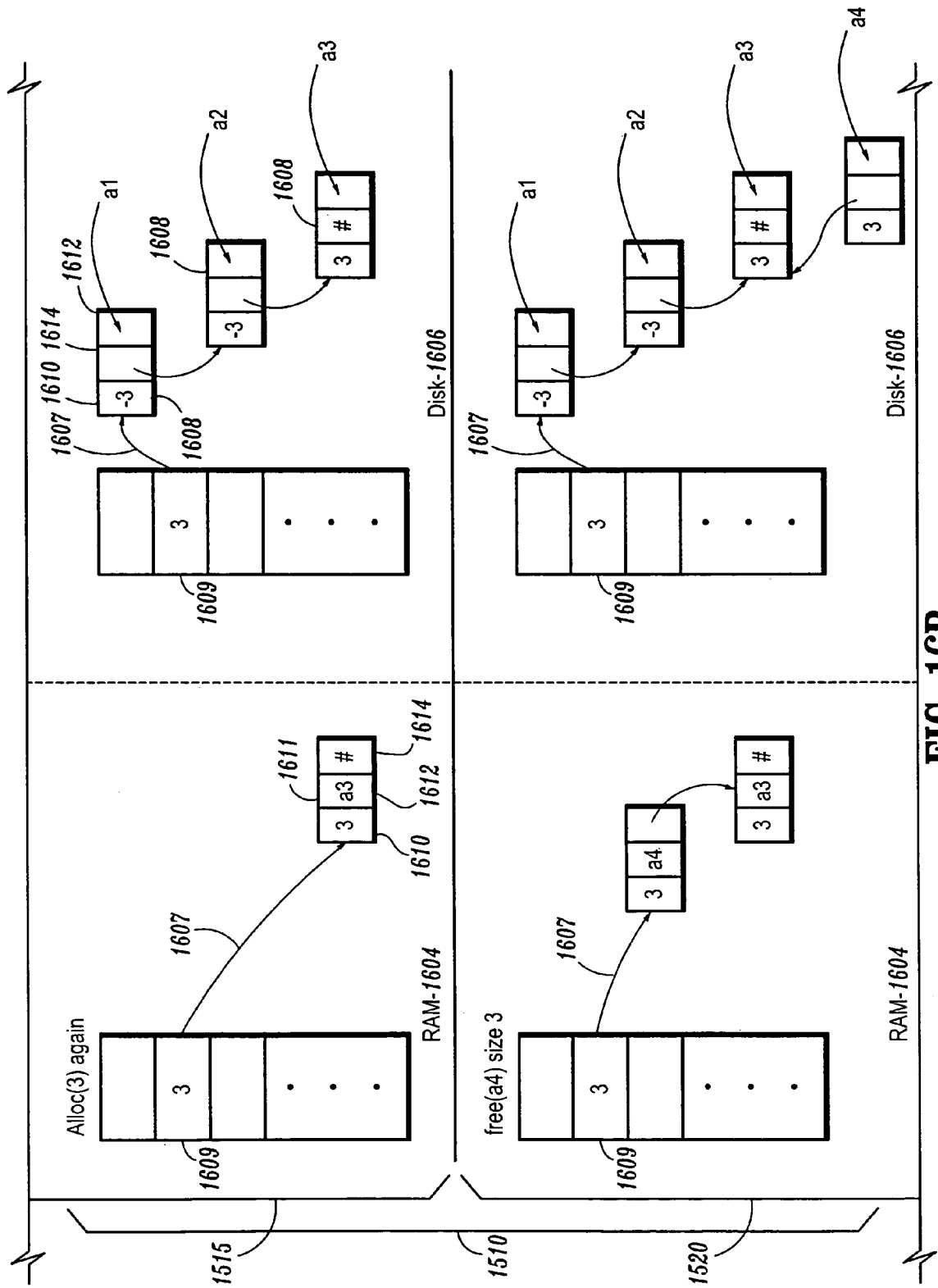
Figure 16C:
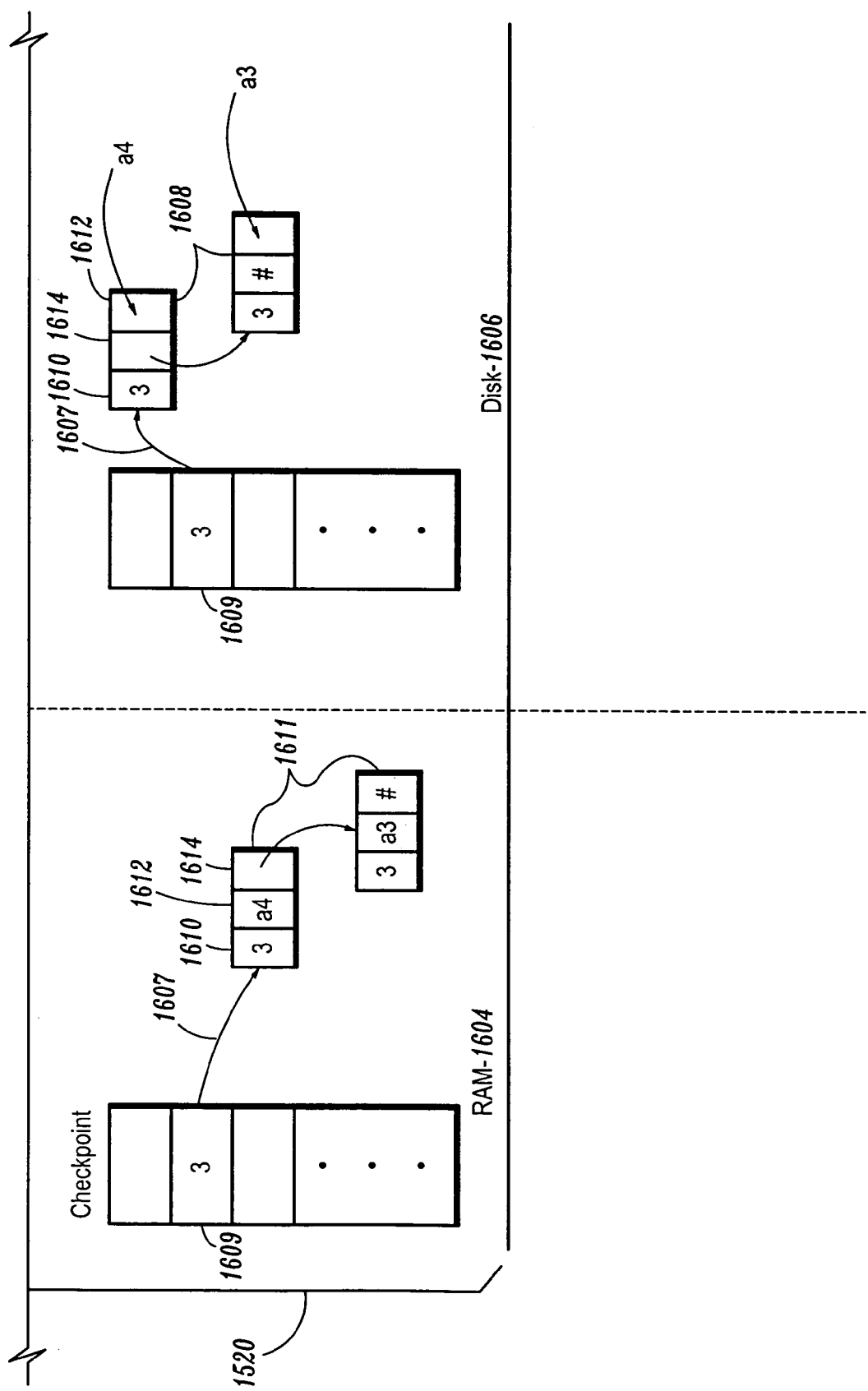

Referring to FIG. 15, memory management method III is depicted for managing persistent storage on disk. It is to be noted the boxes shown in FIG. 15 may be performed or executed in any order. The system maintains at least one list of free blocks on disk in box 1505. The list may be maintained by keeping list pointers in headers. The head of this list may become obsolete, but is updated during checkpoints performed in box 1520. An up-to-date version of this list is maintained in main memory. This method is particularly useful when allocation takes place from a first member of the list. For MFLF methods, allocation from all quick lists and all but the last misc list may take place from the first member of the list, so these lists lend themselves well to memory management method III.

In box 1515, a block is allocated from the beginning of a free list. The in-memory free list is updated. In addition, the block is marked allocated on disk. However, the list pointers on disk are allowed to become obsolete to reduce disk operations. In box 1510, a block is deallocated by adding it to the beginning of an appropriate free list and updating the in-memory data structures. The block is marked allocated on disk, and its header is updated to point to the next block on the free list. To minimize the overhead for this disk update, the allocation status tag and pointer to the next list element may be stored in close proximity to each other on disk. The disk pointer to the head of the list is permitted to become obsolete to advantageously reduce disk operations.

To update head-of-list pointers on disk, the system periodically checkpoints in box 1520. For example, the system may checkpoint after every n transaction, where n is a system parameter. In addition, checkpointing is generally performed before the system is turned off. During the step in box 1520, disk free list pointers are updated from head of list pointers maintained in memory. In systems with multiple free lists, it is preferable to maintain disk free list pointers in contiguous memory locations on disk so that the pointers may be efficiently updated, such as by performing a single block write or multiple writes with little movement of disk heads. Note that if the system fails at a time when one or more free lists on disk are not correct, such free lists may include allocated blocks. Such free lists are fixed after a failure in box 1525.

The system examines each free list on disk managed by memory management method III and eliminates allocated blocks. The system does so by scanning free lists starting from the beginning and examining headers. As soon as the system encounters a block on a free list which is free, the system stops examining the list because the remaining blocks on the list should also be free.

Referring to FIG. 16, an illustrative example of memory management method III is shown. As shown in FIG. 16, memory management is depicted for a plurality of different storage operations for employing the present invention. The processes are divided between a random access memory 1604 and a disk 1606. Memory blocks 1608 are depicted as rectangles. Memory blocks 1608 include numbers representing a size in a first position 1610 of the block, which are positive if free and negative if allocated. The memory blocks 1611 of main memory (RAM 1604) include a free list 1607 which includes an index 1609 representing the blocks having a size of, in this example, "3". An address, e.g., a1, a2, a3, a4 is include in the list 1607 where a corresponding block is located on disk 1606. The addresses of blocks 1608 on disk are indicated by address labels in a position 1612 of blocks 1608. Address labels 1612 are depicted for ease of exposition, and such address labels are not necessarily stored on disk. A position 1614 of blocks 1608 points to a next block of memory or a "#" which means NIL or end of the list.

Storage operations in the example of FIG. 16 are described with reference to FIG. 15. Maintenance of a list of blocks on disk (Box 1505) is performed. Allocation (3) and return pointer to a1 is performed in accordance with box 151.5. Allocation (3), again is performed in accordance with box 1515, as well. Deallocate or free (a3) is performed in accordance with box 1510. Note block 1608 with addresses a2 and a4 point to block address a3. This is fixed by checkpointing. Checkpointing in accordance with box 1520 updates the free list 1609 such that blocks with addresses a4 and a3 are maintained on the free list.

Figure 17:
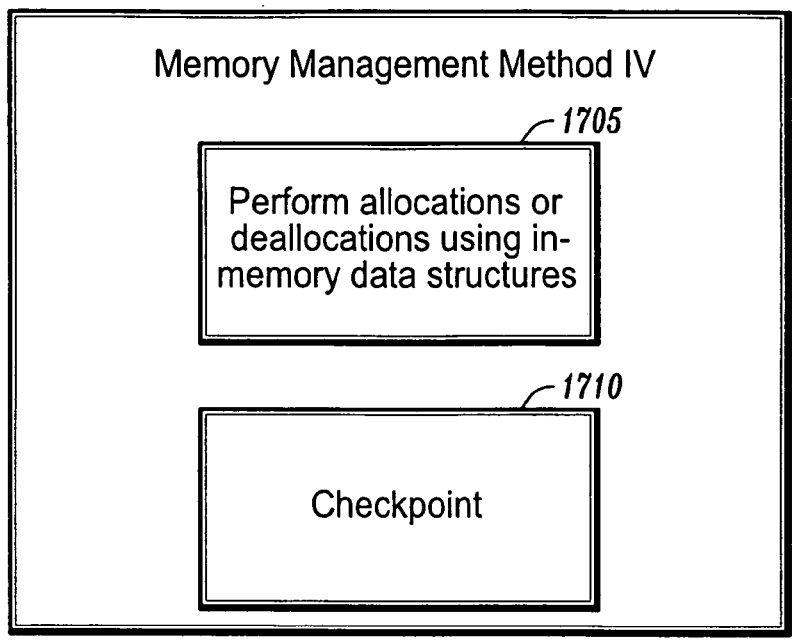
FIG. 17 is a block/flow diagram illustrating memory management method IV in accordance with the present invention.

Referring to FIG. 17, another embodiment of a memory management method is depicted, which will be referred to as memory method IV, for simplicity. It is to be noted the boxes shown in FIG. 17 may be performed or executed in any order. The system maintains in-memory data structures for managing storage. Such in-memory data structures may include lists. Allocations and deallocations are performed by modifying in-memory data structures in box 1705. Usually, disk operations do not take place in box 1705. Thus, allocations and deallocations can be fast. The system periodically checkpoints information to memory in box 1710. For example, the system may checkpoint after every n transaction, where n is a system parameter. In addition, checkpointing is generally performed before the system is turned off. Just before a normal shutdown, the system can store additional information on disk (e.g. structure of free lists in memory, assuming the system is utilizing free lists) which can be read in at a later time to reduce startup times.

Such checkpointing permits the system to restart after a normal shutdown or a failure. Just before a normal shutdown, the system may store information on disk which the system may not store during a normal checkpoint. Such auxiliary information may be read in at a later time to reduce startup times.

Trade-offs of the different memory management methods may be considered for system designers in choosing a memory management method most suitable for performance needs. The memory management methods described herein provide many advantages over the prior art. Memory management method I needs less header space than memory management methods II and III. In addition, memory management method I performs fewer disk writes for allocations and deallocations than II and III. For memory management method I, information on disk is always up-to-date, and no checkpointing is needed.

Memory management method II permits multiple lists to be maintained on disk which can be used to locate blocks of specific sizes during start-up using fewer disk reads than method I. Checkpointing is employed for method II, and list heads on disk may not always be current.

Memory management method III employs free lists and all allocations can be made from the beginning of free lists to get best performance. Method III may be used to locate free blocks of specific sizes during start-up, thus, using fewer reads than methods I and II since method III employs multiple lists. Unlike memory management method II, method III lists only include free blocks (assuming a normal shutdown). Checkpointing is employed, lists on disks may need to be updated, and lists on disk may have to be fixed after a failure.

Memory management method IV performs allocations and deallocations with no disk operations! However, method IV may include more checkpointing procedures than the other methods (e.g., methods I-III). In addition, in the event of a failure, disk memory may be more obsolete using method IV than using the other methods.

Figure 5:
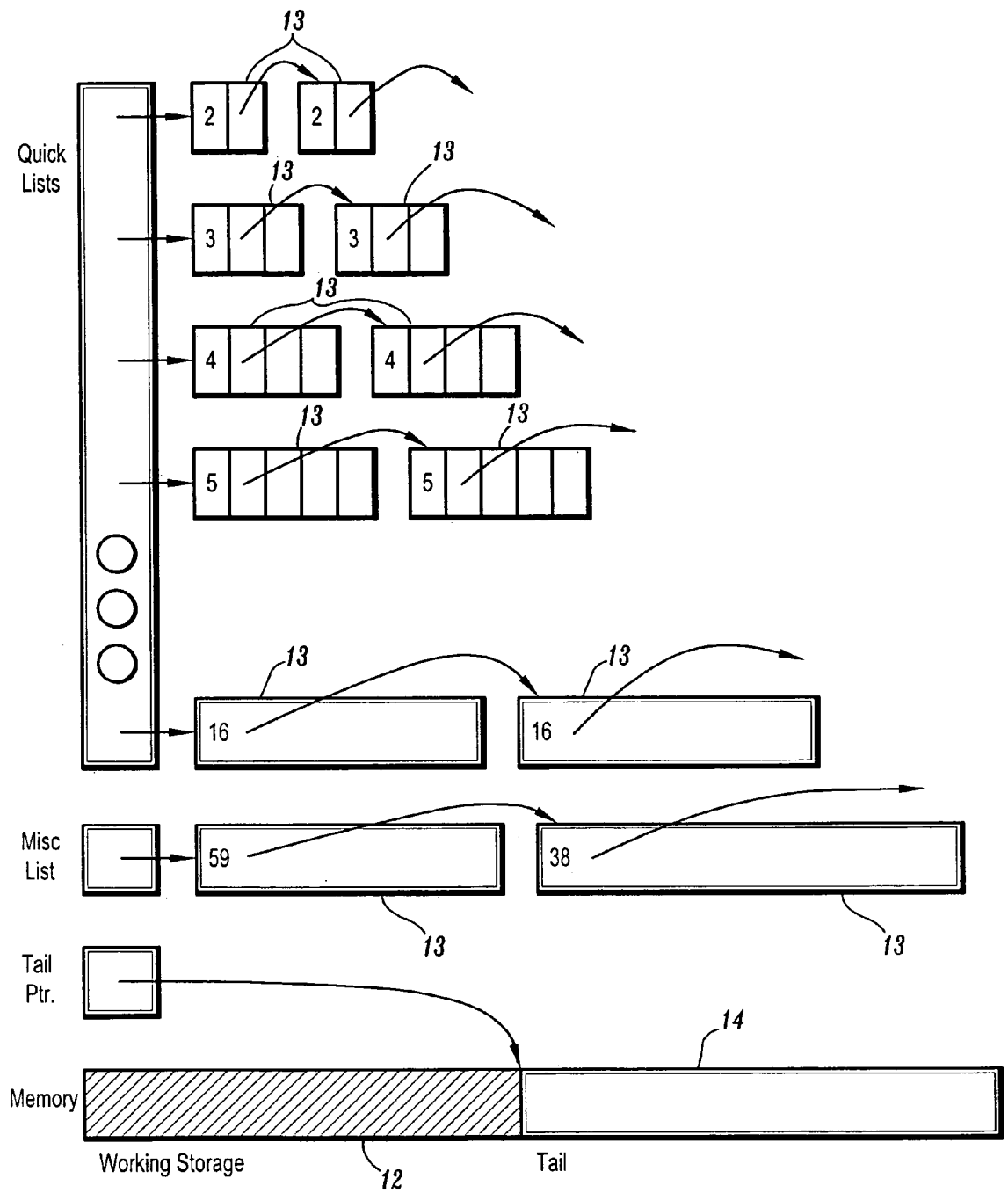
FIG. 5 is a schematic diagram showing an example of a Quick fit for a special case of multiple free list fitting in accordance with the prior art.
Figure 6:
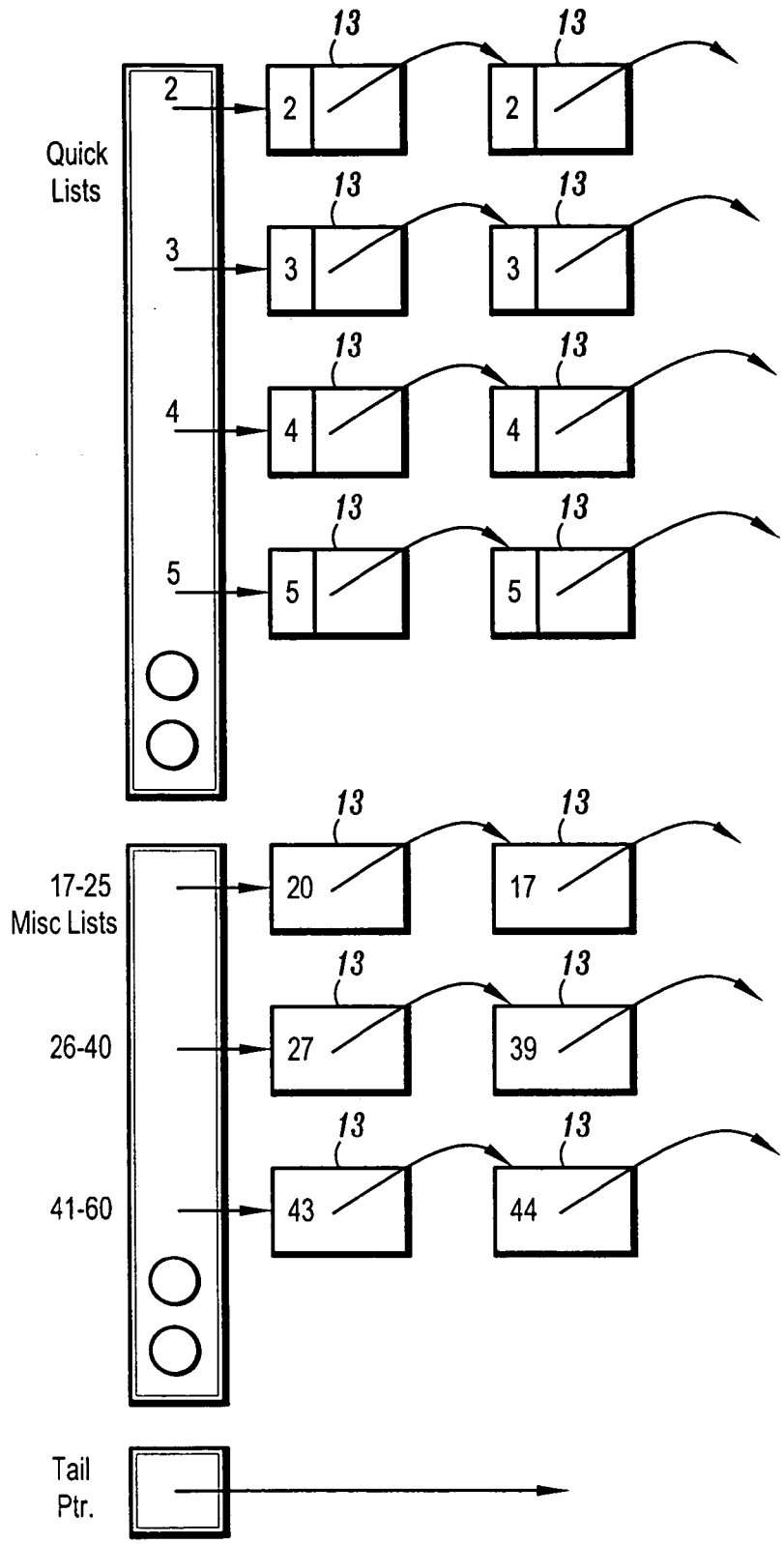
FIG. 6 is a schematic diagram showing an example of multiple free list fitting (MFLF I) in accordance with the prior art.

Another method (management method V) for allocating storage in accordance with the present invention will now be illustratively described. This method is particularly useful when the system is allocating storage from a large block of disk memory (e.g., the tail in FIG. 5) by maintaining and updating a pointer (tail pointer) to the first free byte.

Figure 18:
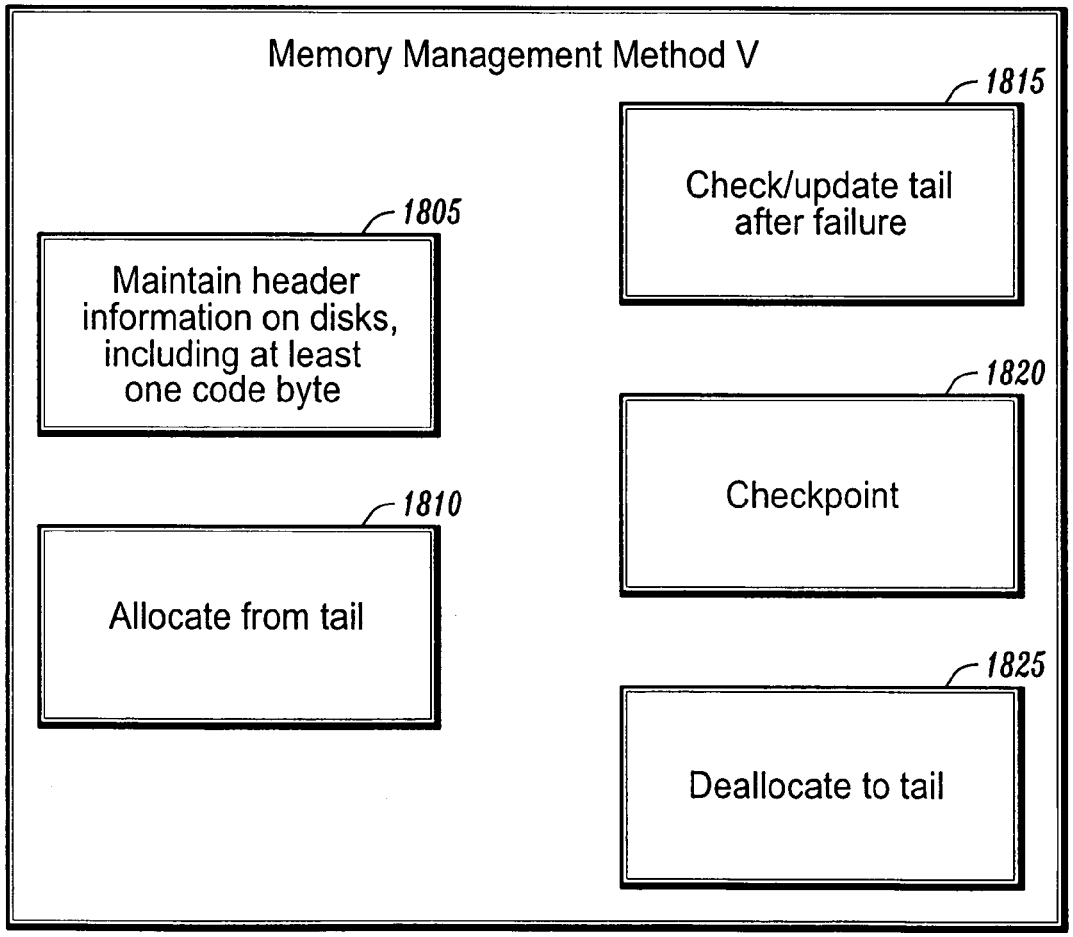
FIG. 18 is a block/flow diagram for managing tail allocations and deallocations in accordance with the present invention.

Referring to FIG. 18, the system maintains headers on disk for blocks, including at least one byte known as a code byte, in box 1805. It is to be noted the boxes shown in FIG. 18 may be performed or executed in any order. The system also maintains variables in memory indicating the current tail pointer and the tail pointer on disk. The tail pointer on disk may be obsolete. In box 1810, the system allocates a block b1 from the tail. Information stored in the header by this step includes an allocated tag, block size, and one or more code bytes. The tail pointer on disk is usually not updated in this step. The reason for this is that the tail pointer may be distant from the header for b1 on disk. Updating the tail pointer on disk may need to include an extra disk operation. By contrast, header bytes for b1 can be kept in close proximity on disk, so all of the updates to the header can generally be done using few (in many cases one disk write is sufficient) disk operations. Special information is stored in code bytes to indicate that the block is no longer part of the tail. It is possible for header bytes used for other purposes to also function as code bytes, reducing or eliminating the overhead incurred by code bytes. For example, memory management methods II and III use header bytes for storing block sizes and list pointers. These bytes could also function as code bytes.

The tail pointer in memory (but not on disk) is updated in box 1810. In box 1825, a block b1 is deallocated to the tail. The code bytes are modified to indicate that b1 is now part of the tail. If the tail pointer on disk, which is cached in memory, so it can be examined without accessing the disk, is current, the tail pointer is updated so that it remains current after b1 is deallocated to the tail. Otherwise, the tail pointer on disk is allowed to remain obsolete.

Updated tail pointers are periodically checkpointed to disk in box 1820. For example, the system may checkpoint after every n transaction, where n is a system parameter. Alternatively, the system may checkpoint after p updates to the tail following the last time the tail pointer on disk was updated, where p is a system parameter. Checkpoints are generally performed before the system is turned off during normal operation.

The cost for updating the tail pointer on disk can thus be amortized across several allocations and/or deallocations. The invention can be used in conjunction with the previously described inventions, such as, for example, the methods described with reference to FIGS. 8 and 9 or memory management methods I, II, and III. If used in conjunction with memory management methods II and III, checkpointing of the tail can be combined with checkpointing of free list(s). For example, suppose that an MFLF system needs checkpointing of the tail pointer and free list pointers. The tail pointer on disk can be stored adjacent to the free list pointers. That way, the tail pointer and free lists can be checkpointed using a single block write or a small number of writes with little disk head movement.

If a system failure occurs, the tail pointer stored on disk might not be current. Box 1815 attempts to correct the tail pointer after a failure. Let t be the stored value of the tail pointer. The system examines bytes which would be code bytes in a header corresponding to a block beginning at t. If these code bytes indicate that t corresponds to a block, the block size s is determined from the header. The tail pointer is incremented to t+s, and the process continues until code bytes are examined indicating that the storage does not correspond to a block. The updated tail pointer is then stored on disk.

In one illustrative example, suppose that memory management method II is being used. Both the size and pointer headers could be used as code bytes. In box 1815, the test for valid code bytes could include verifying that the size bytes store a legal size and the pointer points to a block belonging to an appropriate size class. FIG. 18 implements a probabilistic recovery algorithm. It is possible that the tail pointer will be advanced unnecessarily in box 1815. By appropriate use of code bytes, this probability can be made arbitrarily low. In the worst case, some tail storage may be lost, but allocated storage will not be mistakenly deallocated.

It is possible to use the method of FIG. 18 in conjunction with several different DSA's which use tail-like data structures, such as MFLF algorithms. It is not always necessary to use box 1825 to deallocate blocks to the tail. For example, an MFLF algorithm may not normally try to add a recently freed block to the tail. Instead, the MFLF algorithm may add the freed block to a free list. Storage could be added to the tail during coalescing.

Figure 19:
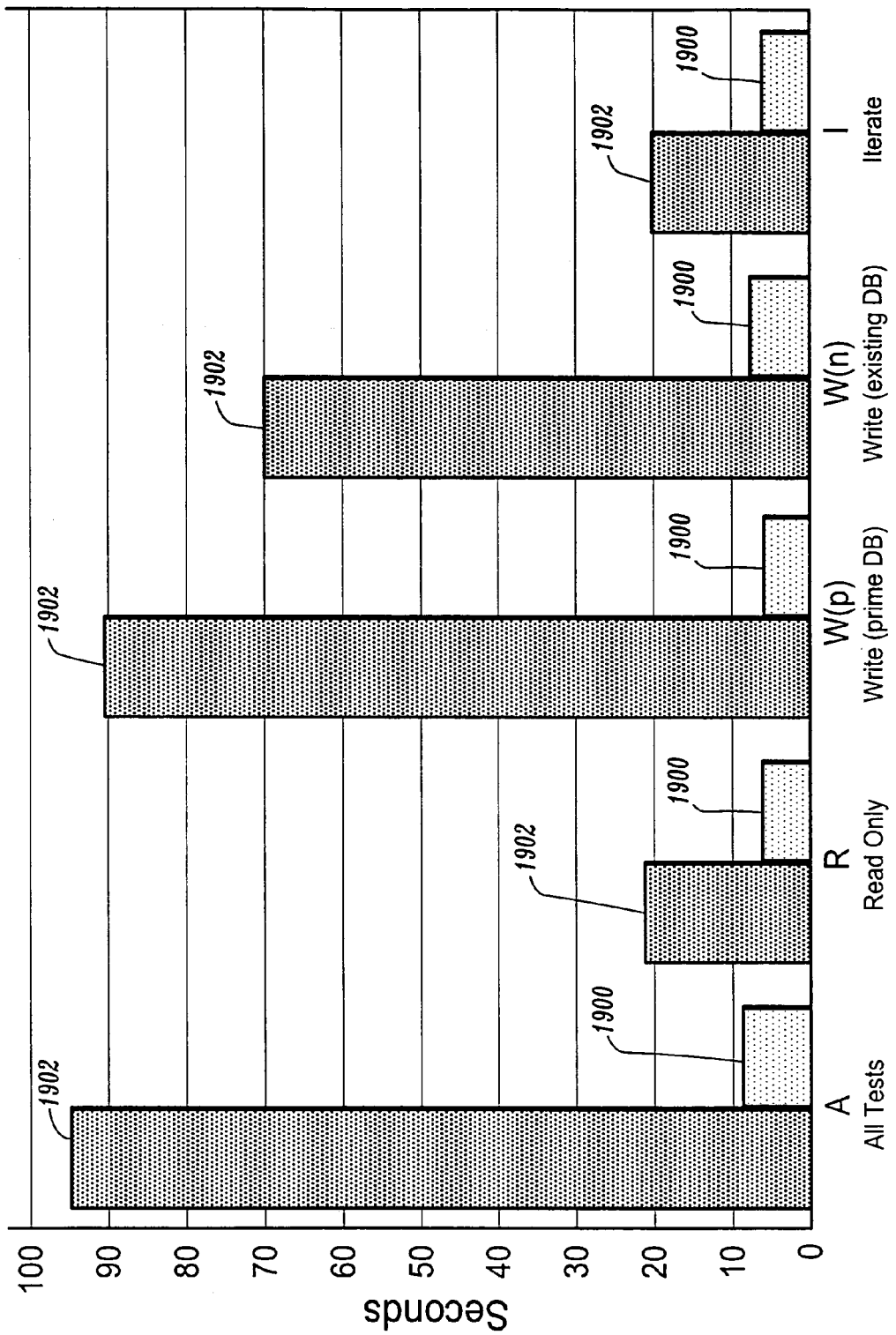
FIG. 19 is a plot of illustrative test results for one embodiment of the present invention versus the prior art.

Referring to FIG. 19, MFLF III, using memory management method I was tested by the inventors against DB2™, which is available commercially from IBM, for performance characteristics. Read and write operations were performed for 5300 items each under 100 bytes in size. Timings reported include initialization times. The test run included:

(A) Run all tests in one execution including simple functional tests.

(R) Read each item once (keyed lookup) from the database.

(Wp) Write each item once to empty database (prime the base).

(Wn) Write each item once to full database (replace each item in primed database).

(I) Run iteration (non-keyed lookup) over each item in the database.

Note that because of initialization times plus the extra functional testing fro test A that (R+Wp+Wn+I) does not add up to A. The database included one table with indexed primary key (string) and data object (LOB). Base tests commit updates only after all updates are complete. Supplemental updates committed after every update or every $5^{th}$ update as shown in FIG. 19. Actual application of the test to DB2 needed to commit every 5 updates, and several tuning parameters were needed for DB2 to complete the tests. The base test results are shown in FIG. 19. Tests times in second show surprising improvements of the present invention, labeled 1900, over DB2, labeled 1902. In most cases an order of magnitude improvement was obtained.

Figure 20:
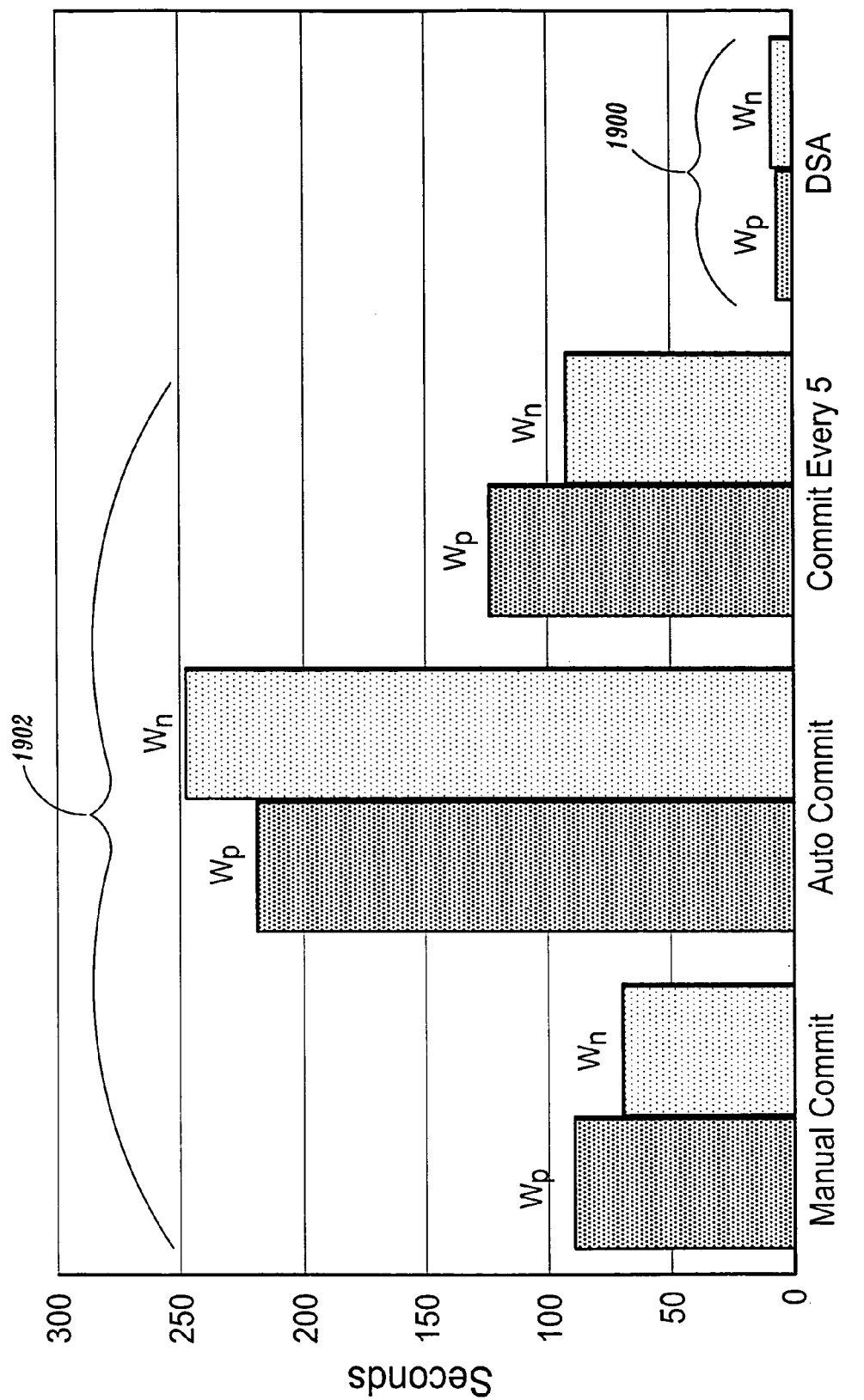
FIG. 20 is another plot of illustrative test results of one embodiment of the present invention versus the prior art.

Referring to FIG. 20, DB2 was run in several modes. For example, application of the test to DB2 was performed in a manual commit, automatic commit and commit every 5 updates, as shown in FIG. 20. The operation times (in seconds) for the present invention for the Wp and Wn tests was greater than an order of magnitude and in some cases greater than two orders of magnitude.

There are a number of variations to the inventions which may be made by one skilled in the art. For example, the DSA's may be parallelized to handle multiple transactions concurrently. This may be appropriate for use with a disk array. Techniques for achieving parallelism are described in the following references:

1) "Dynamic Storage Allocation on a Multiprocessor", Arun Iyengar, Massachusetts Institute of Technology Laboratory for Computer Science TR-560 (PhD Thesis), December 1992; and 2) "Scalability of Dynamic Storage Allocation Algorithms", Arun Iyengar, in Proceedings of IEEE Frontiers '96, October 1996.

Having described preferred embodiments of a system and method for persistent and robust storage allocation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for coalescing adjacent free blocks in persistent storage comprising the steps of:

maintaining a header for each block indicating a size and an allocation status of the block;

coalescing the free blocks by examining header information to combine adjacent free blocks;

periodically storing information in the persistent storage indicating a level of coalescing achieved;

in response to a system failure during coalescing, reading information in the persistent storage to determine the level of coalescing achieved before the system failure; and resuming coalescing at a point based on the information in the persistent storage.

2. The method of claim 1, wherein periodically storing information comprises storing in persistent storage how far coalescing has advanced.

3. The method of claim 1, further comprising:

maintaining headers in persistent storage for a plurality of blocks wherein a header for each block includes a block size and an allocation status of the block;

maintaining at least one data structure in a main memory for allocating and deallocating persistent storage;

allocating a first storage block by:

identifying the first storage block by employing the at least one data structure in the main memory, modifying the at least one data structure in the main storage and assigning an allocation status for the block in the persistent memory, deallocating a second storage block by assigning an allocation status in the persistent memory for the second storage block; and modifying the at least one data structure in the main memory.

4. The method of claim 1 further comprising:
maintaining headers in the persistent storage for a plurality of blocks wherein a header for each block includes a block size, an allocation status of the block, and a pointer;
maintaining at least one data structure in a main memory for allocating and deallocating to the persistent storage;
allocating a first storage block of the plurality of blocks including the steps of:
identifying the first storage block using the at least one data structure in the main memory;
modifying the at least one data structure in the main memory and assigning an allocation status for the first storage block in the persistent storage;
reallocating a second storage block of the plurality of blocks by assigning anallocation status in the persistent storage for the second storage block;
updating a pointer field on disk for the second storage block; and
modifying the at least one data structure in the main memory.

5. The method of claim 1, further comprising:
maintaining multiple sets of free blocks of memory wherein free blocks are added to sets based on size of the free blocks;
in response to a request for a free block of a request size exceeding a first threshold, searching a set for a free block which is at least as large as the request size but smaller than the request size plus a second threshold; and
if the free block is found, allocating the free block in its entirety.

6. The method of claim 1 further comprising:
maintaining a first pointer in a main memory for determining a first free byte in a first block of memory;
maintaining headers in the persistent storage for a plurality of blocks wherein the headers include at least one code byte corresponding to at least one of the blocks; and
allocating a second block from the first block by setting the at least one code byte corresponding to the second block to indicate that the second block is no longer part of the first block and updating the first pointer in the main memory.

7. A program storage device readable by machine, tangibly embodying a program of instructions executable by the machine to perform method steps for coalescing adjacent free blocks in persistent storage, the method steps comprising:
maintaining a header for each block indicating a size and an allocation status of the block;
coalescing the free blocks by examining header information to combine adjacent free blocks;
periodically storing information in the persistent storage indicating a level of coalescing achieved;
in response to a system failure during coalescing, reading information in the persistent storage to determine the level of coalescing achieved before the system failure; and
resuming coalescing at a point based on the information in the persistent storage.

8. The program storage device of claim 7, wherein the instructions for periodically storing information comprise instructions for storing in persistent storage how far coalescing has advanced.

9. The program storage device of claim 7, further comprising instructions for:
maintaining headers in persistent storage for a plurality of blocks wherein a header for each block includes a block size and an allocation status of the block;
maintaining at least one data structure in a main memory for allocating and deallocating persistent storage;
allocating a first storage block by:
identifying the first storage block by employing the at least one data structure in the main memory;
modifying the at least one data structure in the main storage and assigning an allocation status for the block in the persistent memory,
deallocating a second storage block by assigning an allocation status in the persistent memory for the second storage block; and
modifying the at least one data structure in the main memory.

10. The program storage device of claim 7, further comprising instructions for:
maintaining headers in the persistent storage for a plurality of blocks wherein a header for each block includes a block size, an allocation status of the block, and a pointer;
maintaining at least one data structure in a main memory for allocating and deallocating to the persistent storage;
allocating a first storage block of the plurality of blocks including the steps of:
identifying the first storage block using the at least one data structure in the main memory;
modifying the at least one data structure in the main memory and assigning an allocation status for the first storage block in the persistent storage;
deallocating a second storage block of the plurality of blocks by assigning an allocation status in the persistent storage for the second storage block;
updating a pointer field on disk for the second storage block; and
modifying the at least one data structure in the main memory.

11. The program storage device of claim 7, further comprising instructions for:
maintaining multiple sets of free blocks of memory wherein free blocks are added to sets based on size of the free blocks;
in response to a request for a free block of a request size exceeding a first threshold, searching a set for a free block which is at least as large as the request size but smaller than the request size plus a second threshold; and
if the free block is found, allocating the free block in its entirety.

12. The program storage device of claim 7, further comprising instructions for:
maintaining a first pointer in a main memory for determining a first free byte in a first block of memory;
maintaining headers in the persistent storage for a plurality of blocks wherein the headers include at least one code byte corresponding to at least one of the blocks; and
allocating a second block from the first block by setting the at least one code byte corresponding to the second block to indicate that the second block is no longer part of the first block and updating the first pointer in the main memory.

* * * * *